United States Patent
Ackerman et al.

(10) Patent No.: US 10,623,986 B2
(45) Date of Patent: Apr. 14, 2020

(54) RF SIGNAL SEPARATION AND SUPPRESSION SYSTEM AND METHOD

(71) Applicant: Photonic Systems, Inc., Billerica, MA (US)

(72) Inventors: Edward I. Ackerman, Cambridge, MA (US); Charles H. Cox, Carlistle, MA (US)

(73) Assignee: Photonic Systems, Inc., Billerica, MA (US)

( * ) Notice: Subject to any disclaimer, the term of this patent is extended or adjusted under 35 U.S.C. 154(b) by 0 days.

(21) Appl. No.: 15/494,433

(22) Filed: Apr. 21, 2017

(65) Prior Publication Data

US 2017/0230862 A1    Aug. 10, 2017

Related U.S. Application Data

(63) Continuation-in-part of application No. 14/920,740, filed on Oct. 22, 2015.

(51) Int. Cl.
*H04W 28/04* (2009.01)
*H04J 11/00* (2006.01)
(Continued)

(52) U.S. Cl.
CPC .......... *H04W 28/04* (2013.01); *H04J 11/004* (2013.01); *H04J 11/0066* (2013.01); *H04L 27/265* (2013.01); *H04L 27/2647* (2013.01); *H04B 15/02* (2013.01); *H04B 2001/485* (2013.01); *H04L 27/22* (2013.01); *H04L 27/38* (2013.01)

(58) Field of Classification Search
None
See application file for complete search history.

(56) References Cited

U.S. PATENT DOCUMENTS 2,973,512 A    2/1961 Walsh
4,403,331 A *  9/1983 Halpern .............. H04L 27/3411
                                              370/208

(Continued)

FOREIGN PATENT DOCUMENTS

AU    2008227105    4/2013
CN    1652472 A     8/2005

(Continued)

OTHER PUBLICATIONS

"Notification Concerning Transmittal of International Preliminary Report on Patentability (Chapter I of the Patent Cooperation Treaty)" For International Patent Application No. PCT/US2016/055743, dated May 3, 2018, 8 Pages, The International Bureau of WIPO, Geneva, Switzerland.

(Continued)

*Primary Examiner* — Jamaal Henson
(74) *Attorney, Agent, or Firm* — Kurt Rauschenbach; Rauschenbach Patent Law Group, PLLC

(57) ABSTRACT

A method of separating a desired signal from an undesired signal includes obtaining a total input signal comprising the desired signal and the undesired signal in a time domain occupying a time duration from time $t_1$ to time $t_2$ of a single symbol in the desired signal. A transform is performed of the total input signal wherein an output of the transform is a time domain signal representing the desired signal.

26 Claims, 12 Drawing Sheets

(51) Int. Cl.
*H04L 27/26* (2006.01)
*H04B 1/48* (2006.01)
*H04B 15/02* (2006.01)
*H04L 27/38* (2006.01)
*H04L 27/22* (2006.01)

(56) References Cited

U.S. PATENT DOCUMENTS

| | | | |
|---|---|---|---|
| 4,719,412 A | 1/1988 | d'Humieres et al. | |
| 5,074,631 A | 12/1991 | Hamano et al. | |
| 5,287,212 A | 2/1994 | Cox et al. | |
| 5,303,079 A | 4/1994 | Gnauk et al. | |
| 5,369,381 A | 11/1994 | Gamand | |
| 5,389,782 A | 2/1995 | Hilliard | |
| 5,410,750 A | 4/1995 | Cantwell et al. | |
| 5,602,387 A | 2/1997 | Bowen | |
| 5,613,233 A | 3/1997 | Vagher | |
| 5,640,431 A * | 6/1997 | Bruckert | H04B 1/707 375/344 |
| 5,666,382 A | 9/1997 | Thakore | |
| 5,742,591 A * | 4/1998 | Himayat | H04N 7/102 348/E7.052 |
| 5,977,911 A | 11/1999 | Green et al. | |
| 6,028,695 A | 2/2000 | Uemura et al. | |
| 6,081,232 A | 6/2000 | Pittman et al. | |
| 6,137,442 A | 10/2000 | Roman et al. | |
| 6,175,672 B1 | 1/2001 | Newberg et al. | |
| 6,295,395 B1 | 9/2001 | Paek | |
| 6,310,706 B1 | 10/2001 | Heidemann et al. | |
| 6,320,539 B1 | 11/2001 | Matthews et al. | |
| 6,330,098 B1 | 12/2001 | Gopalakrishnan | |
| 6,337,660 B1 | 1/2002 | Esman et al. | |
| 6,393,177 B2 | 5/2002 | Paek | |
| 6,999,541 B1 * | 2/2006 | Hui | G10K 11/178 375/350 |
| 7,050,481 B1 * | 5/2006 | Hulbert | H04B 1/7103 370/342 |
| 7,369,290 B1 | 5/2008 | Cox et al. | |
| 7,555,219 B2 | 6/2009 | Cox et al. | |
| 7,561,803 B2 | 7/2009 | Burns et al. | |
| 7,760,343 B2 | 7/2010 | Roussell et al. | |
| 7,809,216 B2 | 10/2010 | Cox | |
| 7,826,751 B2 | 11/2010 | Cox et al. | |
| 7,970,241 B2 | 6/2011 | Chen et al. | |
| 8,433,163 B2 | 4/2013 | Cox et al. | |
| 8,521,117 B1 | 8/2013 | Gupta et al. | |
| 8,674,870 B2 | 3/2014 | Maunder et al. | |
| 8,775,750 B2 | 6/2014 | Cox et al. | |
| 8,868,006 B2 | 10/2014 | Cox et al. | |
| 2002/0012500 A1 | 1/2002 | Paek | |
| 2002/0106141 A1 | 8/2002 | Gopalakrishnan | |
| 2003/0090769 A1 | 5/2003 | Lagasse | |
| 2003/0147581 A1 | 8/2003 | Doi et al. | |
| 2004/0114542 A1 | 6/2004 | Stopler | |
| 2005/0069327 A1 | 3/2005 | Franck et al. | |
| 2005/0170802 A1 | 8/2005 | Oh et al. | |
| 2007/0161361 A1 | 7/2007 | Vaisanen et al. | |
| 2007/0189778 A1 | 8/2007 | Burns et al. | |
| 2007/0194886 A1 | 8/2007 | Bang et al. | |
| 2007/0206961 A1 | 9/2007 | Iannelli | |
| 2008/0175593 A1 | 7/2008 | Guifang | |
| 2008/0198773 A1 | 8/2008 | Loh | |
| 2009/0060412 A1 | 3/2009 | Chen et al. | |
| 2009/0130981 A1 | 5/2009 | Nagai et al. | |
| 2009/0296790 A1 | 12/2009 | Cheung et al. | |
| 2010/0029350 A1 | 2/2010 | Zhang | |
| 2011/0053525 A1 | 3/2011 | Yi | |
| 2013/0023225 A1 * | 1/2013 | Weber | G01S 7/023 455/296 |
| 2013/0237169 A1 | 9/2013 | Walley et al. | |
| 2014/0086359 A1 | 3/2014 | Daughtridge et al. | |
| 2014/0128008 A1 | 5/2014 | Cox et al. | |
| 2014/0141712 A1 | 5/2014 | Maunder et al. | |
| 2014/0242935 A1 | 8/2014 | Cox et al. | |
| 2015/0288506 A1 | 10/2015 | Pan et al. | |
| 2017/0002728 A1 | 1/2017 | Saeki | |

FOREIGN PATENT DOCUMENTS

| | | |
|---|---|---|
| CN | 101366187 A | 2/2009 |
| CN | 101827047 A | 9/2010 |
| CN | 102006102 A | 4/2011 |
| CN | 103548309 A | 1/2014 |
| EP | 0282293 A2 | 9/1988 |
| EP | 1649539 | 1/2011 |
| FR | 2796766 A1 | 1/2001 |
| JP | 57197934 | 12/1982 |
| JP | 02-094820 | 4/1990 |
| JP | 08-079126 | 3/1996 |
| JP | 09008737 | 1/1997 |
| JP | 2003-530685 | 10/2003 |
| JP | 2004-363862 | 12/2004 |
| JP | 2009-081719 | 4/2009 |
| JP | 2010-056876 | 3/2010 |
| JP | 4478680 | 3/2010 |
| JP | 2010-522451 | 7/2010 |
| JP | 2011-166825 A | 8/2011 |
| JP | 5328680 | 8/2013 |
| KR | 10-2010-0037905 A | 4/2010 |
| KR | 10-0966222 | 6/2010 |
| KR | 10-1222726 | 1/2013 |
| WO | 2005008832 A2 | 1/2005 |

OTHER PUBLICATIONS

Duarte, Experiment-Driven Characterization of Full Duplex Wireless Systems, Aug. 4, 2011, 68 pages, Rice University.

Choi, et al., Achieving Single Channel, Full Duplex Wireless Communication, 12 pages, Stanford University.

Wegener, et al., Simultaneous Transmit and Receive With a Small Planar Array, 3 pages, Purdue University.

Day, et al., Full-Duplex Bidirectional MIMO: Achievable Rates Under Limited Dyanmic Range IEEE, Jul. 2012.

"Notification Concerning Transmittal of International Preliminary Report on Patentability (Chapter I of the Patent Cooperation Treaty)", For PCT/US2011/037136, dated Dec. 6, 2012, 7 pages, International Bureau of WIPO, Geneva, Switzerland.

"Notification of Transmittal of the International Search Report and the Written Opinion of the International Searching Authority, Or the Declaration" For PCT/US2011/37136, dated Oct. 25, 2011, 11 pages, International Searching Authority, Korean Intellectual Property Office, Seo-gu, Daejeon, Republic of Korea.

"Notification Concerning Transmittal of International Preliminary Report on Patentability (Chapter I of the Patent Cooperation Treaty)", For PCT/US2009/041058, dated Nov. 4, 2010, 6 pages, The International Bureau of WIPO, Geneva, Switzerland.

Ackerman, et al., The Effect of a Mach-Zehnder Modulator's Travelling Wave Electrode Loss on a Photonic Link's Noise Figure, Photonic Systems, Inc., Burlington, MA, US.

Anderson, Is a Broadband Low Noise Photonic LInk an Oxymoron?, Lockheed Martin Advanced Technology Center, Palo Alto, CA, US.

Wenzel, Low Frequency Circulator/Isolator Uses No Ferrite or Magnet, RF Design Awards.

"Notification of Transmittal of the International Search Report and the Written Opinion of the International Searching Authority, Or the Declaration" For PCT/US08/003297, dated Jul. 4, 2008, 11 pages, The International Searching Authority/EPO, Rijswijk, The Netherlands.

"Notification Concerning Transmittal of International Preliminary Report on Patentability (Chapter I of the Patent Cooperation Treaty)", For PCT/US2008/003297, dated Oct. 1, 2009, 8 pages, The International Bureau of WIPO, Geneva, Switzerland.

"Notification of Transmittal of the International Search Report and the Written Opinion of the International Searching Authority, Or the Declaration" For PCT/US2009/041058, dated Nov. 30, 2009, 11

(56) References Cited

OTHER PUBLICATIONS pages, International Searching Authority, Korean Intellectual Property Office, Seo-gu, Daejeon, Republic of Korea.
"Notification of Transmittal of the International Search Report and the Written Opinion of the International Searching Authority, Or the Declaration" For PCT/US2014/050343, dated Oct. 30, 2014, 9 pages, International Searching Authority, Korean Intellectual Property Office, Seo-gu, Daejeon, Republic of Korea.
Cox, et al., Demostration of a Single-Aperture, Full-Duplex Communication System, IEEE, Jan. 2013.
Cox et al., Photonics for Simultaneous Transmit and Receive, IEEE MTT-S International Microwave Symposium Digest, Jun. 20, 2011.
"Notification Concerning Transmittal of International Preliminary Report on Patentability (Chapter I of the Patent Cooperation Treaty)", For PCT/US2013/052649, dated Feb. 12, 2015, 6 pages, The International Bureau of WIPO, Geneva, Switzerland.
Ghose, Rabindra, N., Interference Mitigation, 1996, pp. 39-45, IEEE Electromagnetic Compatibility Society, IEEE, Institute of Electrical and Electronics Engineers, New York.
Office Action for Japanese Patent Application No. 2015-525503, dated Jun. 26, 2015, 5 pages, Japanese Patent Office, Japan.
Choi, Yang-Seok, et al. Simultaneous Transmission and Reception: Algorithm, Design and System Level Performance, Dec. 2013, pp. 5992-6010, vol. 12, No. 12, IEEE Transactions on Wireless Communications.
"Office Action" For Chinese Application No. 201380040249.9, dated Oct. 27, 2015, 7 pages, State Intellectual Property Office of the People's Republic of China, Beijing, China.
Ziemer, Rodger E., The Communications Handbook, 1997, pp. 118-130, CRC Press.
"Notification of Transmittal of the International Search Report and the Written Opinion of the International Searching Authority, or the Declaration" for International Patent Application No. PCT/US2016/055743, dated Jan. 23, 2017, 11 pages, International Searching Authority/KR, Korean Intellectual Property Office, Daejeon, Republic of Korea.
"Notification of Transmittal of the International Search Report and the Written Opinion of the International Searching Authority, Or in the Declaration", For International Patent Application No. PCT/US2017/029010, dated Jan. 18, 2018, 13 Pages, ISA/KR, Korean Intellectual property Office, Daejeon, Republic of Korea.
"Search Report" for European Patent Application No. 16857991.0, dated Apr. 23, 2019, 10 pages, European Patent Office, Munich, Germany.
"Transmittal of International Preliminary Report on Patentability (Chapter I of the Patent Cooperation Treaty)" for International Patent Application No. PCT/US2017/029010, dated Oct. 31, 2019, 10 pages, The International Bureau of WIPO, Geneva, Switzerland.
"Office Action" For Chinese Patent Application No. 201680061434. X, dated Oct. 24, 2019, 10 pages, China National Intellectual Property Administration, China.

* cited by examiner

RF SIGNAL SEPARATION AND SUPPRESSION SYSTEM AND METHOD

RELATED APPLICATION SECTION

The present application is a continuation-in-part of copending U.S. patent application Ser. No. 14/920,740, filed Oct. 22, 2015, and entitled "RF Signal Separation and Suppression System and Method" The entire content of U.S. patent application Ser. No. 14/920,740 is incorporated herein by reference.

The section headings used herein are for organizational purposes only and should not to be construed as limiting the subject matter described in the present application in any way.

INTRODUCTION

A common occurrence in wireless communications is to have more than one signal sensed by an antenna. In such situations, it is necessary to be able to separate the various signals from one another. In particular, it is necessary to separate out, from all the sensed signals, undesired signals from the particular signal that is desired to be received. If the desired and undesired signals occupy disjoint portions of the frequency spectrum, then the two signals are orthogonal and frequency filtering can be used to isolate or separate the signals. Similarly, if signals occur at disjoint times, then these are also orthogonal and time gating can be used to separate the signals. However, if the signals are present at the same time and their frequency spectra overlap, then the problem of separating them is fundamentally more challenging, and may require exploiting other differences that may make the signals orthogonal to one another such as a difference in their modulation formats. Signals that differ only in magnitude and/or phase are not orthogonal to one another.

If copies of certain undesired signals are available, then these copies can serve as a reference and be used to distinguish between those certain undesired signals and the remainder of the signals even in the case when the undesired signals are not orthogonal to the desired signal. An example of this situation is when the transmitter(s) of the certain undesired signal(s) are located on the same platform as the receiver for the remainder of the signal(s). Because of the proximity of the transmitter to the receiver, it is relatively easy to obtain a reference copy that fully replicates the certain undesired signal(s) in this situation. In this case, subtracting the reference copy of the undesired signal(s) results in successful separation of the undesired signal(s) from the desired signal(s) whether they are orthogonal to one another or not. That is, even if the desired and undesired signal(s) overlap in time and/or frequency and/or have the same modulation format and/or other features in common with one another, they can be successfully separated from one another when a reference copy of the undesired signal(s) is available for subtraction.

However, it is often the case that it is infeasible or impossible to obtain the needed reference copies of certain undesired signal(s) that need to be separated from the remainder of the signals. This situation can occur when the transmitters of the certain undesired signals are located on different platforms from the receiver of the remainder of the signals. Known systems for separating desired RF signals from undesired RF signals are built on a generally accepted principle by those skilled in the art that it is not possible to separate signals whose spectra overlap unless there is a reference copy of those certain signals available. The reference copy contains the complete undesired signal, i.e. the carrier(s), any subcarrier(s) and any modulation(s) of the carriers/subcarriers. Thus, the copy of the undesired signal can be used to separate the desired RF signals from the undesired RF signals.

To one skilled in the art, obtaining a reference copy of a single undesired signal is exactly equivalent to the undesired signal that is detected by the antenna. That is, in both cases any information that may be on the undesired signal can be obtained by demodulating either the received signal or the reference copy of it. However, by its very nature as an undesired signal, it is rarely the case that one wants to recover any information that may be conveyed by the undesired signal. The more common case is that one wants to simply suppress or remove the undesired signal. In such cases the undesired signal can be removed or suppressed by subtracting a reference copy from the sum of the desired+ undesired signals as detected by the antenna.

A common occurrence, however, is where multiple undesired signals are present simultaneously. In this case, if a reference copy of each of the undesired signals is available, then one could form an aggregate reference signal, which is the sum of the individual undesired signals, and subtract this aggregate reference signal from the sum of the desired+ multiple undesired signals detected by an antenna. This difference between separately detecting all undesired signals and obtaining a reference copy of the aggregate of all the undesired signals is not important when the transmitters of the multiple undesired signals are located on the same platform as the receiver for the desired signal(s), because in this case the aggregate of the undesired signals can be formed by summing the reference copies of all the undesired signals.

The present teaching describes a method for reproducing a reference copy of the aggregate of the one or more undesired signals in the case where the one or more undesired signals are not located on the same platform and therefore no reference copy of these signals is otherwise available. We call this reference copy of the aggregate of the undesired signals a reproduction of the undesired signals to distinguish it from the result of receiving copies of each individual signal. Specifically, the reproduction cannot be decomposed into the individual reference copies of the multiple undesired signals. Hence a reproduction cannot be demodulated to yield any information that may be on any of the individual undesired signals. The reproduction does, however, have sufficient structure to permit subtracting the aggregate of the undesired signals prior to demodulation.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
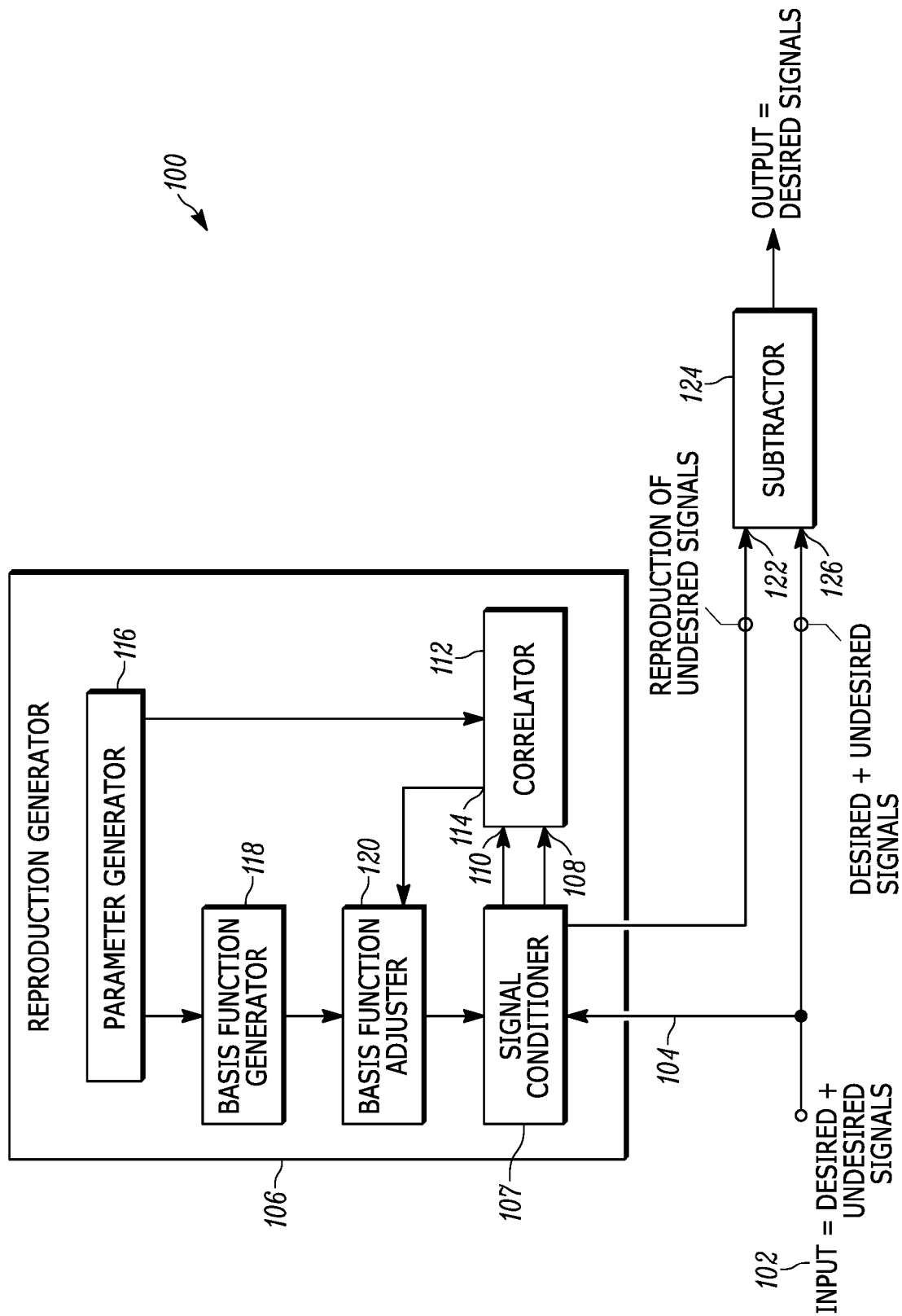
FIG. 1 is a block diagram of an RF signal separator and suppressor according to the present teaching that uses reproduction-based RF signal separation and suppression according to the present teaching.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Communications systems strive to convey a transmitted signal to a receiver. The process of transmitting a signal varies based on the particular technology being used for communications. Generally, a transmitted signal includes data, or other information content being transmitted, together with specific multiplexing and physical-layer modulation formats (e.g. carrier frequencies, subcarriers, frames or time slots) that are used to send the data over a physical medium that is typically shared with other signals. The term "complete transmitted signal" as used herein includes the data layer information and the multiplexing and physical layer formatting.

A receiver is designed to receive the complete transmitted signal. Hence the receiver uses information about the specific multiplexing and physical-layer modulation format to demodulate the complete transmitted signal and to recover the data or other information content contained thereon. The term "receive" as used herein means the recovery or demodulation of the information that is modulated onto the carrier at the transmitter, i.e. the recovery or demodulation of the information conveyed by the complete transmitted signal. The term "desired signal" as used herein to describe the present teaching is the signal that a receiver is designed to receive.

During normal operation, the receiver is also exposed to another class of signals that the receiver is not designed to receive. These signals include sources of interference, such as signals from neighboring transmitters. In some cases, the receiver may be able to receive the complete transmitted signal in the presence of the interference. However, in other cases, the interference may impede, and in severe cases of interference, block, the receiver from receiving the complete transmitted signals.

The term "undesired signal" as used herein to describe the present teaching is the interference signal that impedes or blocks the receiver from receiving the desired signal. For this class of interference signals, it is necessary to suppress the power of the interference signals to a level such that the receiver can indeed receive the complete transmitted, i.e. the desired, signal. If the undesired signal does not overlap the desired signal in either spectra or time, then the undesired and desired signals are clearly orthogonal to one another and therefore, filtering or time gating can be used to suppress the undesired signal(s). On the other hand, if the undesired signal does overlap the desired signal in spectra and time, and a reference copy of the interference is available to the receiver, then the interference reference copy, when appropriately adjusted in magnitude, phase and/or delay, can be subtracted from the interference present at the input to the receiver. However, if an interference reference copy is not available, then a new technique is required to suppress the interference. It is understood that the terms "desired signal" and "undesired signal" are relative terms that refer to signals as viewed by a particular receiver. Hence, these same signals, when viewed relative to another receiver, may have opposite designations, i.e. what is a "desired signal" at one receiver may be an "undesired signal" for another receiver and vice versa.

One aspect of the present teaching is that it provides a new class of signal detector that generates a reproduction of the undesired, or interference, signal. This reproduction signal is then subtracted from the interference present at the input to the receiver, in lieu of the reference copy. Prior art systems that use a reference copy of the undesired signal require multiple reference signals, one corresponding to each undesired signal, to subtract from the multiple undesired signals. In contrast the new reproduction-based technique of the present teaching treats all the undesired signals in the aggregate. Hence only one reproduction signal is needed to subtract from the aggregate of all the undesired signals.

Typically, in prior art receivers, there are two classes of signals present at the receiver input: desired signals and noise. For the desired signal class, sufficient information is available to receive the signal. There should be sufficient information about the specific multiplexing and physical-layer modulation format to demodulate the complete transmitted signal and recover the data or other information content contained thereon. For noise, there is no known multiplexing and physical-layer modulation and there is no data or other information content to recover. However, receivers in many radio frequency wireless communication systems are also exposed to a class of signals that fall between desired signals and noise. For this class of signal, there is sufficient information of the specific multiplexing and physical-layer modulation format of the signal to generate a reproduction of the undesired signal. In some scenarios, however, such as when there is more than one undesired signal present, there is only enough information to subtract the aggregate of the undesired signals, and not enough information to separate and/or demodulate each undesired signal separately. As such, it is not always possible to recover the data or other information content contained thereon, and so this class of signals cannot always be fully received as that term is defined herein.

Thus, we define herein a "reproduction" of a signal as distinct from a "reception" of a signal. A reception contains not only the format and multiplexing information about the signal, but also the information content of the signal. When a reproduction needs to reproduce more than one signal, the reproduction does not contain the information content of the signals. For example, when the signal is in fact the sum of several individual signals, a reproduction does not contain the format and multiplexing information about each individual signal. However, a reproduction of a signal, when properly adjusted, can be used to separate the aggregate of all of the individual signals from other signals that differ in modulation format or specific spectral content even if the aggregate of the individual signal overlaps in time and/or frequency spectra with these other signals. This is one of the unexpected findings of the present teaching: that in order to separate a signal, it is only necessary to generate a reproduction of the undesired signal(s). If the reproduction that is generated is good, or in other words sufficiently close to the signal(s) as it (they) would be received (i.e. "reception" of a signal or signals), then the reproduction can be used to subtract out the undesirable signal(s), even in the cases where that desired signal is not fully orthogonal in modulation format or specific spectral content to the undesired signal(s).

In contrast to prior art receivers, the present teaching provides a new class of signal detector, distinct from a receiver, which generates a reproduction of the undesired, or interference, signal. This reproduction signal is then subtracted from the interference present at the input to the receiver, in lieu of the reference copy. The RF signal separation and suppression system of the present teaching does not need to receive the signal in order to suppress the undesired signal class. Rather, the RF signal separation and suppression system generates a reproduction of the undesired signal, or if there is more than one undesired signal, the RF signal separation and suppression system generates a reproduction of the vector sum of all the undesired signals. The reproduction of the undesired signal(s) can be generated without the need to "receive" the undesired signals, i.e. without the need to demodulate them. Thus, one aspect of the RF signal separation and suppression system of the present teaching is that it generates a reproduction of undesired signal(s), but without the need to demodulate those signal(s) as is required in prior art receivers. Subtraction of the reproduction of the undesired signal(s) can then be used to recover the desired signal from a combination of desired and undesired signals. It is not necessary to fully demodulate the undesired signal(s) to generate a so-called reproduction signal, which can be used as a reference signal to subtract out the undesired signal(s).

In one aspect of the present teaching, the RF signal separation and suppression system of the present teaching separates the undesired signals from the desired signal, and thereby improves reception of the desired signal by the receiver. That is, the RF signal separation and suppression system of the present teaching provides a new type of detector that has sufficient knowledge about the undesired signals to distinguish that portion from the desired signal in order to improve reception of the desired signal. However, the knowledge about the undesired signals in many cases is insufficient to recover information that may be contained thereon. Consequently, as defined herein, the signal separator is in general not a receiver. In some embodiments, the distinguishing property or properties render the signals orthogonal to one another and, in these cases, are not merely a difference in say magnitude alone and/or phase alone. In some embodiments, the properties do not render the signals fully orthogonal.

Said differently, an RF signal separation and suppression system according to the present teaching processes the combination of the desired and undesired signals that are coupled into the system at an input port with a reproduction generator that creates a reproduction of the undesired signal(s). The term reproduction in this context means the action or process of making a copy of something. The fidelity of the reproduction will be sufficient for distinguishing the undesired signal from the remaining desired signal. However, in many cases, the reproduction will not be sufficiently detailed to permit recovering the information contained in the undesired signal.

FIG. 1 is a block diagram of an RF signal separator/suppressor 100 according to the present teaching that uses reproduction-based RF signal separation and suppression according to the present teaching. An input 102 of the RF signal separation and suppression system 100 couples in signals that include desired and undesired signals. The input 102 is electrically connected to an input 104 of a reproduction generator 106. The reproduction generator 106 includes a signal conditioner 107 having an input that is connected to the input 104. The signal conditioner 107 includes a first output connected to a first input 108 and a second output that is connected to a second input 110 of a correlator 112. The correlator 112 performs correlation of signals provided to the first 108 and second 110 inputs. The correlation is generated at an output 114 of the correlator 112.

The reproduction generator 106 includes a parameter generator 116 that provides basis function parameters to a basis function generator 118. One skilled in art will appreciate that a basis function is an element of a particular basis for a function space. Every continuous function in the function space can be represented as a linear combination, with proper weighting, of basis functions. In the method of the present teaching, the function of interest is the signal to be separated. The parameter generator 116 also provides parameters to the correlator 112. The parameters provided by the parameter generator 116 include the signal parameters of the signal that is to be separated. In some embodiments, if the desired signal(s) is (are) to be separated, then its (their) signal parameters are generated by the parameter generator 116. In some embodiments, if the undesired signal(s) is (are) to be separated, then its (their) signal parameters are generated by the parameter generator 116.

Using the parameters provided by the parameter generator 116, a basis function generator 118 produces the desired functional representation of the aggregate of the signals to be separated as a linear combination of weighted basis functions. In some embodiments, using the parameters provided by the parameter generator 116, a basis function generator 118 produces the carrier(s) and subcarrier(s) of the signal to be separated. The output of the basis function generator 118 is connected to one input of a basis function adjuster 120. A second input of the basis function adjuster 120 is connected to the output 114 of the correlator 112. The basis function adjuster 120 output is connected to a second input of the signal conditioner 107. The basis function adjuster 120 adjusts the weighting of the basis functions, which in some methods according to the present teaching comprises the amplitudes and the phases of the carrier(s) and subcarrier(s) provided by the basis function generator 118, to maximize the correlation between the output of the reproduction generator and the sum of the signal(s) to be separated and the signal(s) to be kept. A third output of the signal conditioner 107 is the output of the reproduction generator 106. The output of the reproduction generator 106 is electrically connected to a first input 122 of a subtractor 124. The input 102 of the RF signal separator/suppressor 100 is electrically connected to the second input 126 of the subtractor 124. The subtractor 124 subtracts the reproduction of the signal to be separated from the sum of the signal(s) to be kept and the signal(s) to be separated. The output of the subtractor 124 provides an output signal that includes the signal(s) to be kept with the signal(s) to be separated suppressed. Thus, the output signal from the RF signal separation and suppression system 100 includes the desired signal(s) and a suppressed aggregate of the undesired signal(s).

In some embodiments, the reproduction generator 106 performs three steps. The first step is for the basis function generator 118 to generate the basis function(s) of the signal to be separated. The second step is for the basis function adjuster 120 to adjust the signals provided by the basis function generator 118. The third step is for the correlator 112 to perform the correlation. The adjuster 120 operates in conjunction with the correlator 112 to maximize the correlation between the output of the reproduction generator 106 and the sum of the signal to be separated and the signal to be kept.

It will be noted in FIG. 1 that there is no mention of whether any of the signals and/or functions are in analog or digital form. This is intentional. One skilled in the art of implementing the system shown in FIG. 1 will be able to evaluate the myriad tradeoffs among analog hardware, analog signal processing, digital hardware and digital signal processing to arrive at an implementation that has an optimum balance of cost, compatibility and performance for a particular application. For example, if the input signals 102 are in digital form and the output is also desired to be in digital form, then one implementation option would be to implement all the functions in FIG. 1 using digital hardware and signal processing. This would be the case if the desired and undesired signals both have powers that are within the range that can be digitized by present analog-to-digital converters (ADCs). In other applications of the present teaching the power of the input signals 102, particularly the undesired signal(s), may be sufficiently high that it(they) exceed the maximum input power of present ADCs. In these applications it may be desirable to implement at least the subtractor 124 using analog hardware. The resulting output of the subtractor 124 which contains predominantly the desired signal(s), may have a sufficiently low power that it can be digitized by present ADCs. In embodiments where the remainder of the functions shown in FIG. 1 is implemented digitally, a digital-to-analog converter (DAC) would need to be inserted in the output of the basis function adjuster 120 that feeds the input 122 to the subtractor 124.

The RF signal separation and suppression system of the present teaching is well suited for improving the performance of mobile telephony systems because, in a mobile telephony environment for a particular mobile user, the interfering up-link signals from mobile users, who are co-located with a particular mobile user, are much stronger than the desired down-link signal a particular mobile user desires to receive from the remotely located base station. That is, the up-link signals from generally co-located mobile users are relatively strong signals that interfere with the much lower power down-link signals, which are generally from a distant base station. Generally, the interfering up-link signals are not needed by the single particular mobile user. These interfering up-link signals from generally co-located mobile users are the undesired signals as that term is used herein. The relatively low power down-link signals, however, are needed by a particular mobile user. These downlink signals are the desired signal to the single particular mobile user as that term is used herein.

In prior art mobile telephony systems, the required suppression of the strong up-link signals is provided by a frequency diplexer. But the high rejection required, typically 50 dB, and the closely spaced up- and down-link channels make the diplexer difficult to design and costly to manufacture. In addition, these diplexers introduce a high insertion loss for the weaker down-link signals that adversely affects the ability to distinguish these signals from noise. Thus, if the present teaching is used in conjunction with the diplexer of prior art systems, the combination offers an advantageous way to enhance the suppression that prior art systems achieve with a diplexer alone. Since, as described below, the present teaching is capable of achieving higher suppression than a diplexer, the present teaching offers the advantageous alternative of completely eliminating the need for the prior art use of a diplexer.

One feature of the RF signal separation and suppression system and methods of the present teaching is that they support a mobile telephone system frequency plan in which the separation between the carrier frequencies of the up- and down-link signals is zero, i.e. both signals are communicated simultaneously on the same channel. This configuration is referred to as simultaneous transmit and receive (STAR) or single-channel, full duplex communications. Since in a STAR system there is no frequency separation between the up- and down-link signal carriers, a diplexer cannot be used to provide suppression of the stronger up-link signals.

One important feature of the RF signal separation and suppression system of the present teaching is that it only requires information about the signal format of the undesired signals to render a portion of the undesired signal(s) distinguishable, and thus separable and/or suppressible. Thus, the RF signal separation and suppression system of the present teaching is effective at suppressing the undesired signals irrespective of the data that are being conveyed by that format.

In mobile telephony systems, the format of the multiplexing and physical layer transmission is standardized and well known. Therefore, the format of the undesired signals to be separated is known. The RF signal separation system of the present teaching then can use known information about the signal format to generate a reproduction of the undesired signals in the aggregate. The reproduction when of sufficient quality can be used to separate undesired signals without significantly affecting the desired signals. The payload or the data in the interfering signal(s), however, are not known. However, modulation of the data onto a carrier or subcarrier imparts a particular magnitude and phase onto the carrier. Hence, if one can provide a mechanism to duplicate the magnitude and phase onto an otherwise un-modulated carrier, then one can construct a reproduction of the undesired signal(s). Consequently, one aspect of the present teaching is that it is not necessary to know the payload or data to separate signals according to the present teaching. In particular, in the general case where there are multiple undesired signals to be separated, it not necessary to know the payload or data to separate signals according to the present teaching. In the special case where there is only one undesired signal to be separated, and the format of the modulation is also known, e.g. analog FM, digital QPSK, etc., then, in addition to separating out the undesired signal reproduction, the undesired signal could also be demodulated so as to recover or receive the payload or data being conveyed.

In general, for cellular systems, multiple regular-shaped cells, typically hexagonal or circular in shape, are used to cover a cellular service area. Each cell is assigned multiple RF channels, with each channel addressed by only one cellular base station. The group of multiple RF channels can be reused in other cells, but to avoid co-channel interference, the same group of multiple RF channels is not reused in adjacent neighboring cells.

Long-Term Evolution (LTE) systems, which are commonly marketed as 4G LTE, use a relatively new standard for wireless communication of high-speed data for mobile phones and data terminals. These 4G Long Term Evolution (LTE) systems are now being widely deployed, and feature broader bandwidth than previous generations of cellular technology. High bandwidth is required for today's high-speed cellular services demanded from smart phones and other portable cellular devices. Technologies that can achieve a 3×increase in the spectral efficiency of a cellular service area are among the requirements for the new "5G" standard that is presently in development. Single-channel, full-duplex communication, i.e. STAR, is listed as one of the key approaches to realizing the required increase in spectral efficiency.

One of the Long Term Evolution (LTE) communication formats uses Frequency-Division Duplexing (FDD) in which the up- and down-link signals are communicated simultaneously using different frequency channels. Within the FDD format a resource block is the smallest unit of RF signal resources that can be allocated to a mobile user in an LTE system. An LTE resource block is 180 KHz wide in frequency and 1 slot long in time. Each slot is 500 msec in duration, in which either 6 or 7 resource elements of 66.7-µs length are fit, with twelve symbols of data modulating twelve subcarriers during 66.7 µs in each resource element. In frequency, resource blocks are either 12×15 KHz subcarriers or 24×7.5 KHz subcarriers wide. Resource blocks consisting of 66.7-µs elements with 24 subcarriers spaced by only 7.5 KHz are used only for broadcast. The number of subcarriers used per resource block for most channels and signals is twelve subcarriers.

Figure 2:
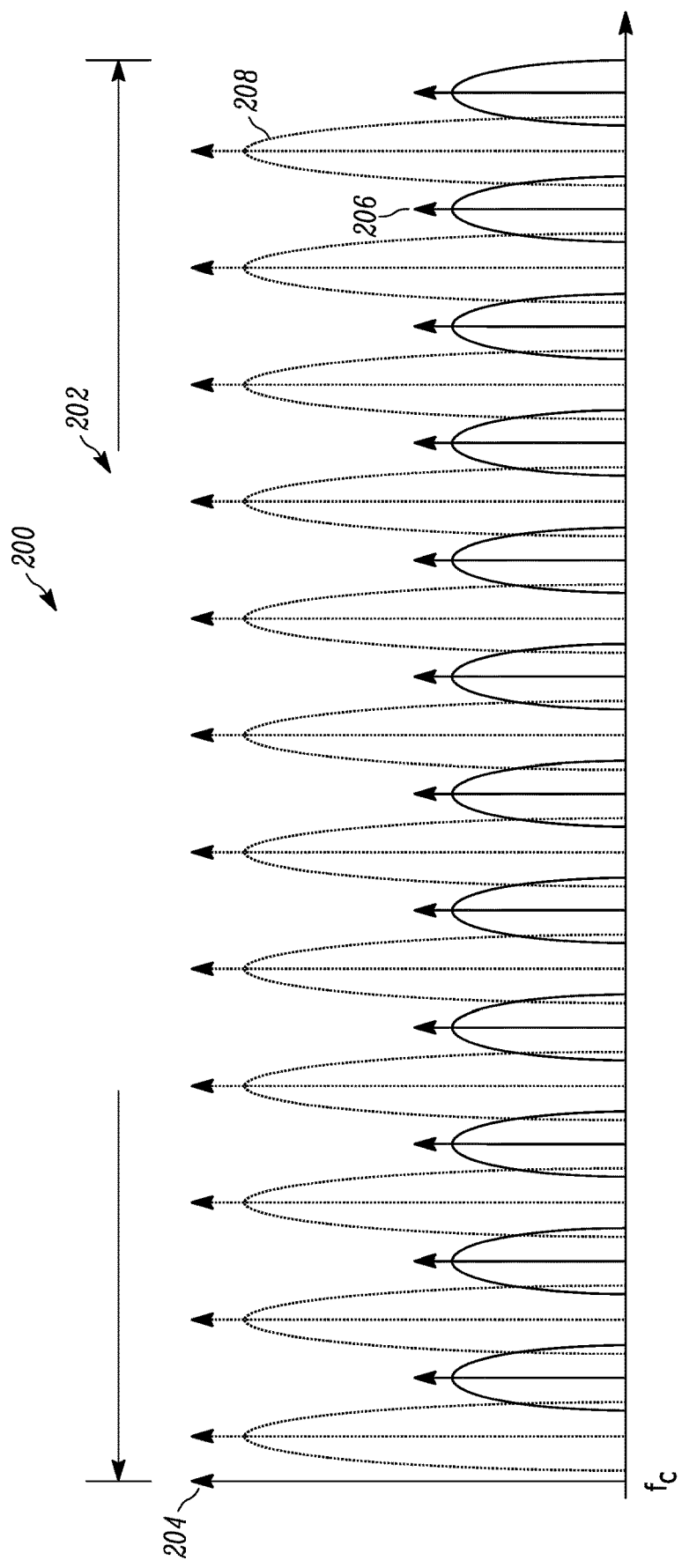
FIG. 2 illustrates a spectrum plot of a Long Term Evolution (LTE) resource block in which both up- and down-links share a single channel assigned to a cell that is used to communicate between a base station and mobile users within the cell.

FIG. 2 illustrates a spectrum plot 200 of the LTE resource block 202 closest to a carrier frequency 204, $f_c$, assigned to a cell that is used to communicate between a base station and mobile users within the cell using a STAR format; i.e. both the up- and down-link signals use the same carrier frequency 204. There are two sets of signals 206, 208 modulated on the carrier frequency 204, $f_c$. The down-link signal 206, which is the signal that is transmitted by the base station to the mobile users, has twelve subcarriers spaced 15 KHz apart, modulating the main carrier frequency of the particular channel 204. No down-link subcarrier is transmitted on the frequency of the channel main carrier, $f_c$. The up-link signal 208, which is the signal that is transmitted by the mobile user to the base station, also has twelve subcarriers spaced 15 KHz apart. The up-link comb of subcarrier frequencies is offset from the main carrier by half the subcarrier spacing or 7.5 KHz. The up-link signal 208 uses single carrier frequency-division multiplexing (SC-FDM) to encode the data to be sent and the down-link signal 206 uses orthogonal frequency-division multiplexing (OFDM) to encode the data to be sent. Both modulation formats combine a large number of closely spaced frequency subcarriers that are modulated with low rate data. The transmitted data is split across all the carriers to give resilience against selective fading from multi-path effects.

LTE bandwidths range from 1.4 MHz to 20 MHz. A 1.4 MHz bandwidth channel includes six resource blocks, while a 20 MHz channel includes one hundred resource blocks. The available bandwidth influences a variety of decisions including the number of carriers that can be accommodated in the orthogonal frequency-division multiplexing signal, which influences signal properties such as the symbol length. The greater the bandwidth, the greater the channel capacity.

The LTE subcarriers are spaced 15 KHz apart from one another as shown in FIG. 2. A symbol duration of 1/(15=66.7 μs is used. For a down-link signal, which uses orthogonal frequency-division multiplexing, each of the twelve subcarriers in one resource element conveys a single symbol in 66.7 μs, and therefore at a rate of 15 Ksps (kilosymbols per second) for each subcarrier and 180 Ksps for the full set of twelve subcarriers. For an up-link signal, which uses single-carrier frequency-division multiplexing, twelve symbols are also conveyed during 66.7 μs, but with each symbol occupying its own temporal division within this period and modulating all twelve subcarrier frequencies identically in that short time. In both the down- and up-link signals, the data symbols may be modulated onto the subcarriers using any one of a number of formats, such as quadrature phase shift keying (QPSK), 16- or 64-quadrature amplitude modulation keying (16-QAM or 64-QAM, respectively). Thus, a raw symbol rate of 18 Msps (megasymbols per second) in a 20 MHz channel bandwidth system leads to a 108 Mbps data rate in the example where each symbol is using 64-QAM and is able to represent six bits.

Figure 3:
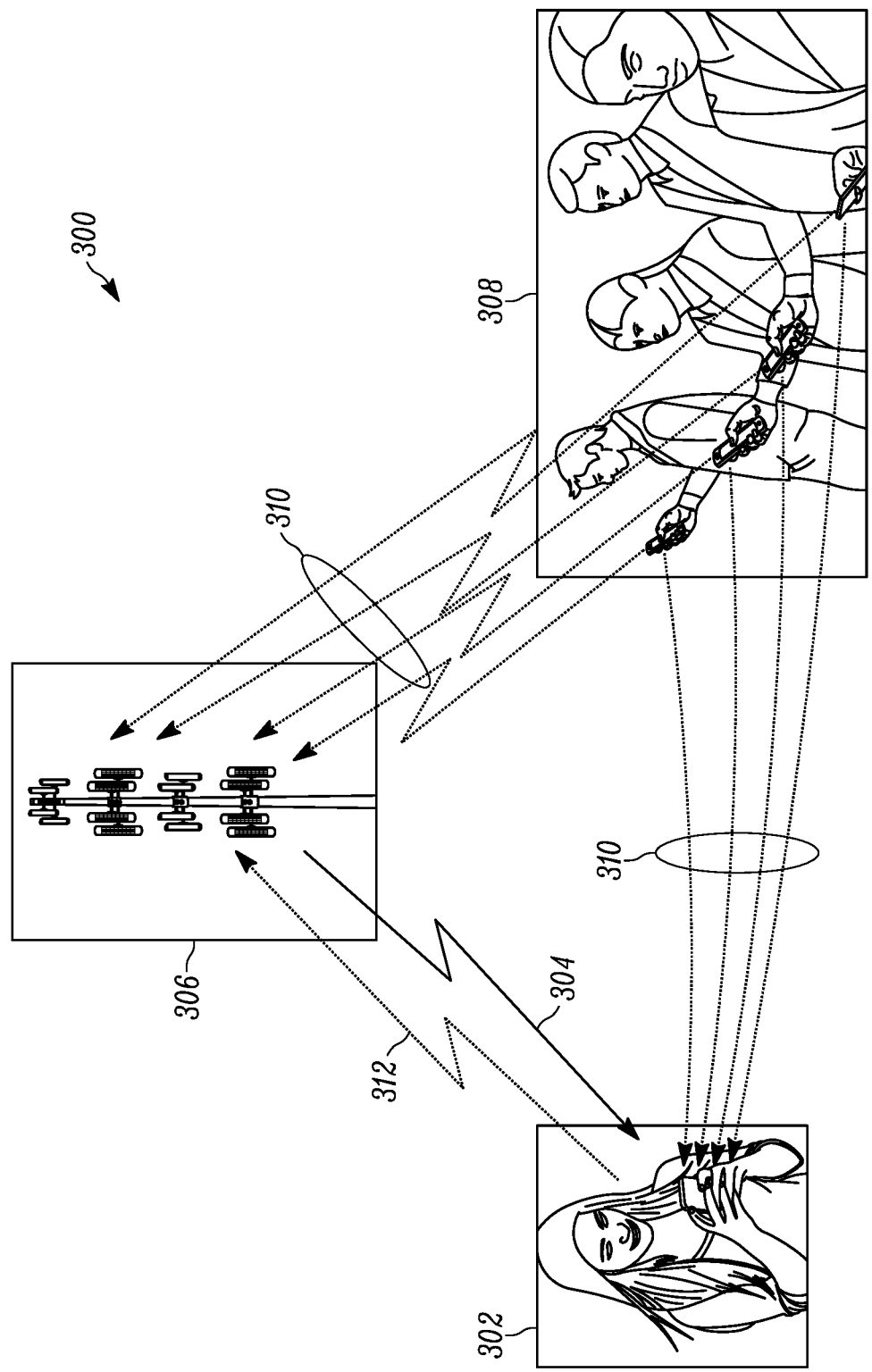
FIG. 3 illustrates a block diagram of a mobile user configuration to which the RF signal separation and suppression system according to the present teaching can be applied.

FIG. 3 illustrates a block diagram of a mobile user configuration 300 applicable to the RF signal separation system of the present teaching. In the configuration shown in FIG. 3, a particular mobile user 302 is attempting to receive a down-link signal 304, which is the desired signal as described herein, from a base station 306. Simultaneously, four co-located mobile users 308 are sending up-link signals 310, which are described herein as undesired signals, to the base station 306. Since the co-located mobile users 308 are closer to the particular mobile user 302 than the particular mobile user 302 is to the base station 306, the up-link signals 310 from the co-located mobile users 308 can be significantly more powerful than the down-link signal 304 from the base station 306 that is received by the particular mobile user 302. Thus, the methods and apparatus of the present teaching provide an alternative to the prior art frequency diplexer for applications described herein, as well as a means of implementing STAR when the up- and down-link signals for each user are on the same carrier frequency channel, $f_c$. If the up-link signals 310 are sufficiently powerful they can completely mask the lower power down-link signal 304, which effectively cuts off the mobile user 302 from the base station 306. In some methods according to the present teaching, a particular mobile user 302 generates an up-link signal 312. In these methods, a means of separating the desired down-link signal 304 from that undesired up-link signal 312 in addition to separating it from the undesired up-link signals 310 from the co-located mobile users 308 can be used. In these methods, a reference copy of the particular user's own up-link signal 312 is available to the particular user 302. There exist prior art methods of separating that undesired signal from the desired down-link signal 304. Known methods include, for example, the method described in U.S. Pat. No. 9,209,840, "Same-Aperture Any-Frequency Simultaneous Transmit and Receive Communication System."

In legacy implementations of LTE FDD the data being communicated by the up-link signals 310 and down-link signal 304 are on subcarriers that are located in different frequency bands. Hence a diplexer can be used to suppress the strong up-link signals from co-located users as sensed by a particular user. However, in an LTE STAR implementation, as shown in FIG. 2, the up-link signal 310 and down-link signal 304 are on the same sub-carrier, which renders a diplexer ineffective at suppressing the strong up-link signals from co-located users as sensed by a particular user. Consequently a new means, such as the method described by the teaching contained herein, is required.

Figure 4A:
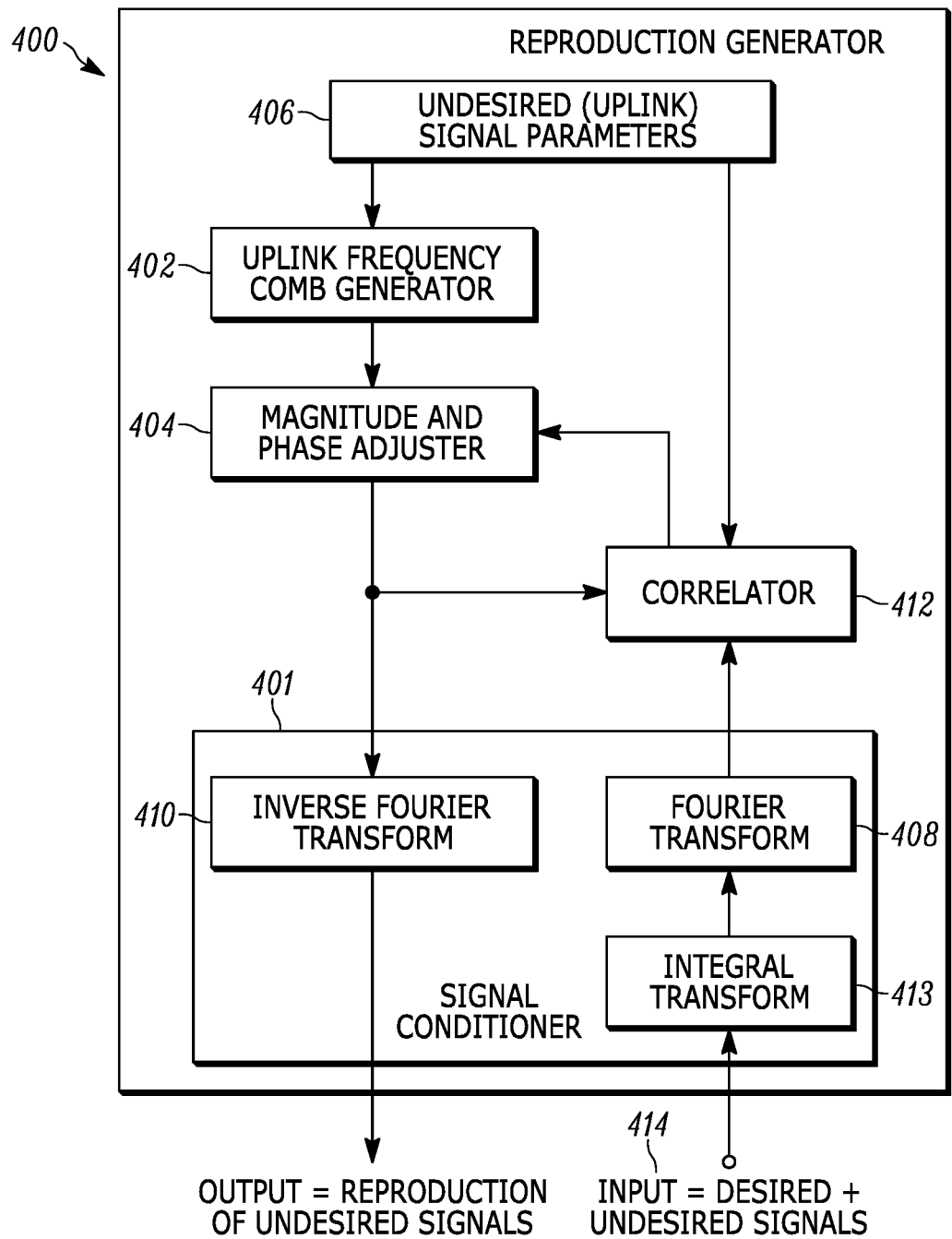
FIG. 4A illustrates a block diagram of one embodiment of the RF reproduction generator that uses integral processing in the time domain followed by transformation into the frequency domain and then frequency domain processing according to the present teaching to separate signals in a mobile phone system employing the LTE signal format.

The method of the present teaching can be applied to cellular telephony systems. The method generates a single reproduction that is the aggregate (vector sum) of all the undesired up-link signals. Consider first the case where there is only one mobile user that is co-located with a particular user. FIG. 4A illustrates a block diagram of one embodiment of the RF reproduction generator 400 that uses frequency domain processing, which is enabled by a specific form of a signal conditioner 401 according to the present teaching to separate signals in a mobile phone system employing the LTE signal format. Comparing the embodiment of the reproduction generator 400 illustrated in FIG. 4A to the embodiment of the reproduction generator 106 illustrated in FIG. 1, the basis function generator 118 of FIG. 1 comprises an uplink frequency comb generator 402. The basis function adjuster 120 of FIG. 1 comprises a magnitude and phase adjuster 404. The parameter generator 116 of FIG. 1 comprises a parameter generator 406 that provides signal parameters of the uplink signal of an LTE signal format. The RF reproduction generator 400 also includes a signal conditioner 401, similar to the signal conditioner 107 that was described in connection with FIG. 1, which includes a Fourier transform processor 408 at the input, and an inverse Fourier transform processor 410 at the output. The RF reproduction generator 400 also includes a signal correlator 412. The signal conditioner 401 includes an integral transform processor 413 that is described below as being prior to the input to the Fourier transform processor 408.

The RF reproduction generator 400 generates an LTE up-link frequency comb in compliance with the LTE standard using the uplink frequency comb generator 402. See LTE Evolved Universal Terrestrial Radio Access (E-UTRA), Radio Resource Control (RRC), Protocol Specification (3GPP TS 36.331 version 10.7.0 Release 10). The magnitude and phase adjuster 404 adjusts the magnitude and phase of each of the LTE subcarriers in the frequency comb. An input 414 of the RF reproduction generator 400 couples in signals that include desired and undesired signals. The input is electrically connected to the Fourier transform processor 408 after being operated upon by the integral transform processor 413.

Figure 4B:
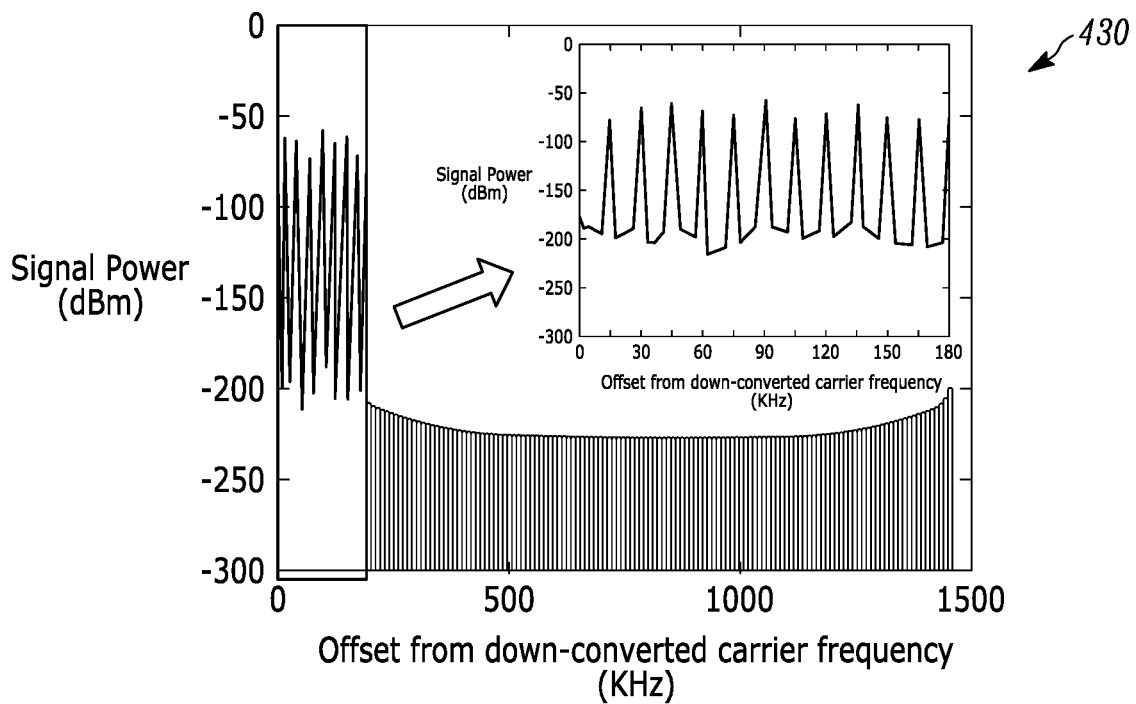
FIG. 4B illustrates, in a mobile telephony scenario, the output spectrum of an embodiment of an integral processor in the time domain followed by a Fourier transform processor of the present teaching when only the down-link signal is present.

FIG. 4B illustrates the output spectrum 430 of an embodiment of a Fourier transform processor when only the down-link signal is present. For the down-link signal, which uses an OFDM format, each of the twelve subcarriers is modulated for a duration of 66.7 μs by a data symbol that is to be conveyed. The output of the Fourier transform processor 408 when only the down-link signal is present, is shown in FIG. 4B. It is important to note that this spectrum contains non-zero terms around each of the subcarriers, which are located every 15 KHz from 0 to 180 KHz. For the up-link signal, which uses a SC-FDM format, all the carriers are modulated for 1/12 of the 66.7-μs duration by a data symbol that is to be conveyed.

Figure 4C:
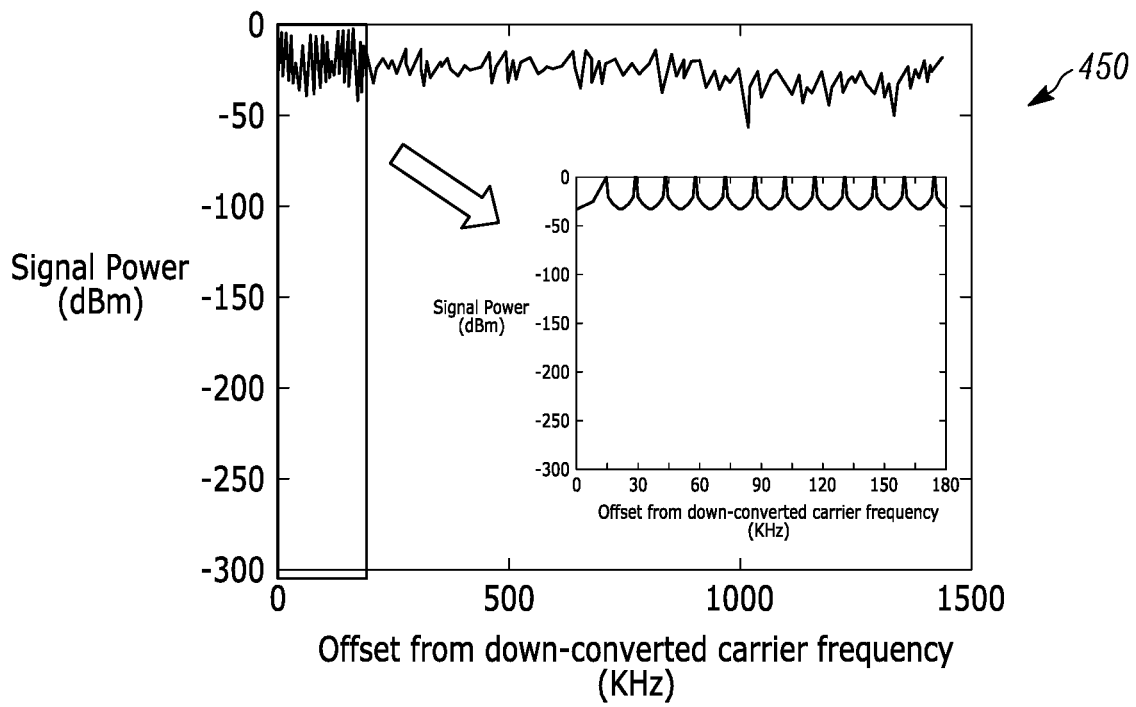
FIG. 4C illustrates, in a mobile telephony scenario, a plot of the output spectrum of an embodiment of an integral processor in the time domain followed by a Fourier transform processor of the present teaching when only the up-link signal is present.

FIG. 4C illustrates a plot 450 of the output spectrum of an embodiment of a Fourier transform processor 408 when only the up-link signal is present. It is important to note that the spectrum of the up-link signal, like the down-link signal, contains non-zero terms every 15 KHz, but unlike the down-link signal the up-link signal also contains non-zero components at dc (i.e., f=0) and at frequencies all the way out to 1.4 MHz. In the example being presented here the undesired signal is the up-link signal. Since we wish to separate, as opposed to demodulate, the undesired signal, we do not need to recover the data that are contained on each of the undesired signal subcarriers. Thus, in the methods and apparatus of the present teaching we only need to reproduce the up-link frequency comb in the aggregate. Thus, for reproduction, as opposed to reception, the present teachings only require generating for each subcarrier of the up-link frequency comb, the same magnitude and phase as the vector sum of all the subcarriers of the undesired signals for each data symbol.

Referring to FIG. 4A, the output of the Fourier transform processor 408 is connected to a first input of a signal correlator 412. The second input to the signal correlator 412 is the output of the magnitude and phase adjuster 404, which adjusts the magnitude and phase of the output of the up-link frequency comb generator 402 for each subcarrier in the up-link frequency comb. The output of the correlator 412 adjusts the magnitude and phase adjuster 404 so as to maximize the correlation between the frequency comb generator 402, as modified by the adjuster 404, and the undesired up-link signal(s). In one embodiment the correlator is able to maximize the correlation with only the up-link signal by performing the correlation over the portion of the spectrum above 180 KHz, which contains frequency components of only the up-link signal. Under the condition of maximum correlation, the output of the correlator 412 is the reproduction of the undesired up-link signal in the frequency domain. To convert the reproduction back into the time domain, the output of the magnitude and phase adjuster 404 also feeds the inverse Fourier transform processor 410.

Referring to FIG. 1 and FIG. 4A, the output of the inverse Fourier transform processor 410 that is connected to the input 122 of the subtractor 124 is the desired reproduction signal in the time domain. Typically, the modulation that is on each of the subcarriers is changing as a function of time. In some methods according to the present teaching, the reproduction is constantly updated at least as fast as the modulation on the undesired up-link is changing, which is at the bit or symbol rate, depending on the type of modulation that is being used. The result of this process is a reproduction of the frequency comb of the undesired signal in the frequency domain that tracks in time the changes in the magnitude and phase of the undesired signal.

The signal parameter generator 406 provides the operating parameters to the up-link frequency comb generator 402 and to the maximize signal correlator 412. The operating parameters are determined based on the known attributes of the signals to be separated, which in this example comprise the undesired signals. These parameters include one or more signal parameters, such as the sampling frequency, $F_s$, the number of samples per bit, N, the sampling interval, $T=1/F_s$, and the number of bits to examine, B. These parameters may be determined a priori and coded into the Fourier transform processor 408, the signal correlator 412, and the inverse Fourier transform processor 410. In some embodiments, the parameters are chosen to accommodate a radio frequency signal comprising undesired radio frequency signals having twelve subcarriers spaced 15 KHz apart.

Referring to both FIG. 1 and FIG. 4A, the output of the reproduction generator 400 is electrically connected to a first input of the subtractor 122. The input 102 is electrically connected to the second input of the subtractor 126, which subtracts the reproduction of the undesired signal from the sum of the desired and undesired signals. The output of the electrical subtractor 124 is the desired signal with the undesired signal suppressed.

The known information about the up-link signals, which are undesired interference signals as described herein, is the number and frequency spacing of the undesired subcarriers. This information represents known frequencies of the undesired radio frequency signal, and this information serves to distinguish the undesired signal. For example, in some cellular telephony systems, there are twelve subcarriers spaced 15 KHz apart, centered on the main carrier frequency of a channel, as illustrated and described in connection with FIG. 2. This subcarrier frequency comb is present whenever an up-link signal is present. Thus, in cellular telephony systems, the reproduction of the undesired up-link signal interference is performed by generating a frequency comb in which the magnitude and phase of each subcarrier tracks the magnitude and phase of the corresponding subcarrier of the M undesired signals, where M≥1.

The known information about the up-link signals also includes the fact that they modulate the subcarriers using single-carrier frequency-division multiplexing (SC-FDM) as opposed to the orthogonal frequency-division multiplexing (OFDM) technique used to modulate the subcarriers in down-link signals. If, for example, the modulation format is QPSK, during each 66.7-μs period twelve down-link symbol phases—represented here as $\phi_{QPSK,n}$, where n=1, 2, ..., 12 and each is either $-3\pi/2$, $-\pi/2$, $+\pi/2$ or $+3\pi/2$—modulate the carrier frequency $f_{carrier}$ as follows:

$$\text{Downlink}_{12\,symbols} = A_{down} \sum_{n=1}^{12} e^{j(2\pi[(f_{carrier}+f_n)]t+\varphi_{QPSK,n})},$$

where the subcarrier frequencies $f_n$ are spaced by 15 KHz and t=0–66.67 μsec. In the resource block closest in frequency to $f_{carrier}$, the lowest-frequency subcarrier is $f_1$=15 KHz and $A_{down}$ is the down-link signal amplitude. Therefore, before upconversion from baseband, or after downconversion to baseband, the downlink symbols have the following form:

$$\text{Downlink at baseband}_{12\,symbols} = A_{down} \sum_{n=1}^{12} e^{j(2\pi n[15\,KHz]t+\varphi_{QPSK,n})}.$$

In the SC-FDM modulation method used in the up-link signals, by contrast, each symbol has a subcarrier frequency all to itself but the symbols all share the one 66.7-μs resource element, in SC-FDM each of the twelve symbols in a resource element has its own 1/12$^{th}$ of the 66.7-μs period (or ~5.56 μsec) all to itself, during which that symbol modulates all 12 of the subcarriers. As in the case of the down-link signal, there are twelve subcarriers in a resource element, spaced by 15 KHz, but for the up-link the lowest-frequency subcarrier is only 7.5 KHz from the carrier frequency.

Therefore, at baseband the up-link symbols in each 66.7-μs element of the lowest-frequency resource element have the following form:

$$\text{Uplink at baseband}_{12\,sym} = A_{up} \sum_{m=1}^{12} \sum_{n=1}^{12} e^{j(2\pi[2n-1][7.5\,KHz][t-(m-1)T]+\varphi_{QPSK,m})},$$

where T≈5.56 μsec and $A_{up}$ is the up-link signal amplitude.

If a down-link signal modulating the twelve down-link subcarrier frequencies closest to the down-link carrier frequency is received in the absence of any interfering up-link signal, is down-converted to baseband and is sampled N times during a 66.7-μs period, the Fourier transform ($\mathcal{F}$) of the signal during that period is as follows (assuming N>12 and is an integer multiple of 12):

$$\mathcal{F}(\text{Down-link}) = 2\pi A_{down} \sum_{n=1}^{12} e^{j\varphi_{QPSK,n}} \varepsilon(f - n[15\,\text{KHz}]).$$

where δ is an impulse function. It can be seen from this equation that there are exactly twelve non-zero terms in $\mathcal{F}$ (Down-link), regardless of how large N is. Specifically, the Fourier transform of one 66.7-μs resource element of an LTE signal in general can potentially have content at dc and at frequencies equal to n·15 KHz, where n=0, 1, 2, ... N−1. Therefore, whereas the number of samples, N, determines the maximum frequency in the Fourier transform, if the resource element contains only a down-link signal and no up-link signals then the Fourier transform will have "content" only at the frequencies corresponding to n=1, 2, ... 12. The choice of N, therefore, need only be dictated by the Nyquist condition whereby the maximum frequency in the Fourier transform—i.e., (N−1)·15 KHz—should be at least a factor of 2 greater than the maximum frequency of the signal being sampled.

If, by contrast, an up-link signal modulating the twelve up-link subcarrier frequencies closest to the up-link carrier frequency is received in the absence of a down-link signal, downconverted and sampled N times during 66.7 μs, the Fourier transform of this signal would not have the form shown above for the following two reasons. First, the down-link 66.7-μs resource element is occupied by one complete cycle of the lowest-frequency subcarrier, two complete cycles of the second-lowest, and so forth up to twelve complete cycles of the highest-frequency subcarrier in the lowest-frequency resource block. In contrast, the up-link does not complete one cycle of even the highest frequency subcarrier before the phase modulation of the subcarriers corresponding to one data symbol changes to another phase corresponding to the next data symbol. Second, even if the twelve up-link subcarrier frequencies were to exist in complete cycles during the 66.7 μs resource element, these subcarrier frequencies are not included among the N discrete frequencies in the Fourier transform of that resource element. These discrete frequencies are equal to n/(66.7 μs), where n=0, 1, 2, ... N−1, or specifically, 0, 15 KHz, 30 KHz, ... (N−1)·15 KHz, whereas the twelve up-link subcarrier frequencies are 7.5 KHz, 22.5 KHz, ... 172.5 KHz. Therefore, unlike the Fourier transform of a down-link signal, which has non-zero content only at the twelve frequencies equal to the down-link subcarrier frequencies, in the Fourier transform of an up-link signal the signal energy that modulated the twelve up-link subcarriers is distributed across all N frequencies.

In one embodiment of the method of the present teaching, the aggregate of up-link signals that is to be subtracted from the total received signal during a 66.7-μs resource element to recover the down-link signal in that resource element is reproduced by iteratively subtracting trial signals from the total signal received during that resource element, computing the Fourier transform of the difference, and checking whether the dc term of the Fourier transform has been driven to nearly zero. Because the dc (n=0) component of the Fourier transform of the down-link signal has zero magnitude, any non-zero magnitude at the dc component in the Fourier transform of the total signal at the receive antenna minus the trial signal must therefore be an indication that the trial signal is not a reproduction of the aggregate of up-link signals at the receive antenna. Iterations of the subtraction of trial signals therefore continue until the dc component of the Fourier transform has magnitude sufficiently close to zero.

A second embodiment of the method of this teaching resembles the embodiment previously described, in that the aggregate of up-link signals that is to be subtracted from the total received signal during a 66.7-μs resource element to recover the down-link signal in that resource element is reproduced by iteratively subtracting trial signals from the total signal received during that resource element, and is also similar to the embodiment previously described in that the Fourier transform of the difference is computed. In this second embodiment, however, the components of the Fourier transform that are compared to zero may include not only the dc (n=0) component but also any or all of the components at frequencies corresponding to n=13, 14, ... N−1. Again, because all components of the Fourier transform of the down-link signal have zero magnitude for all n not equal to 1, 2, ... 12, any non-zero magnitude at other frequencies in the Fourier transform of the total signal at the receive antenna minus the trial signal must therefore be an indication that the trial signal is not a reproduction of the aggregate of up-link signals at the receive antenna. Iterations of the subtraction of trial signals therefore continue until the dc and/or any or all of the n>12 components of the Fourier transform have magnitudes sufficiently close to zero.

Figure 4D:
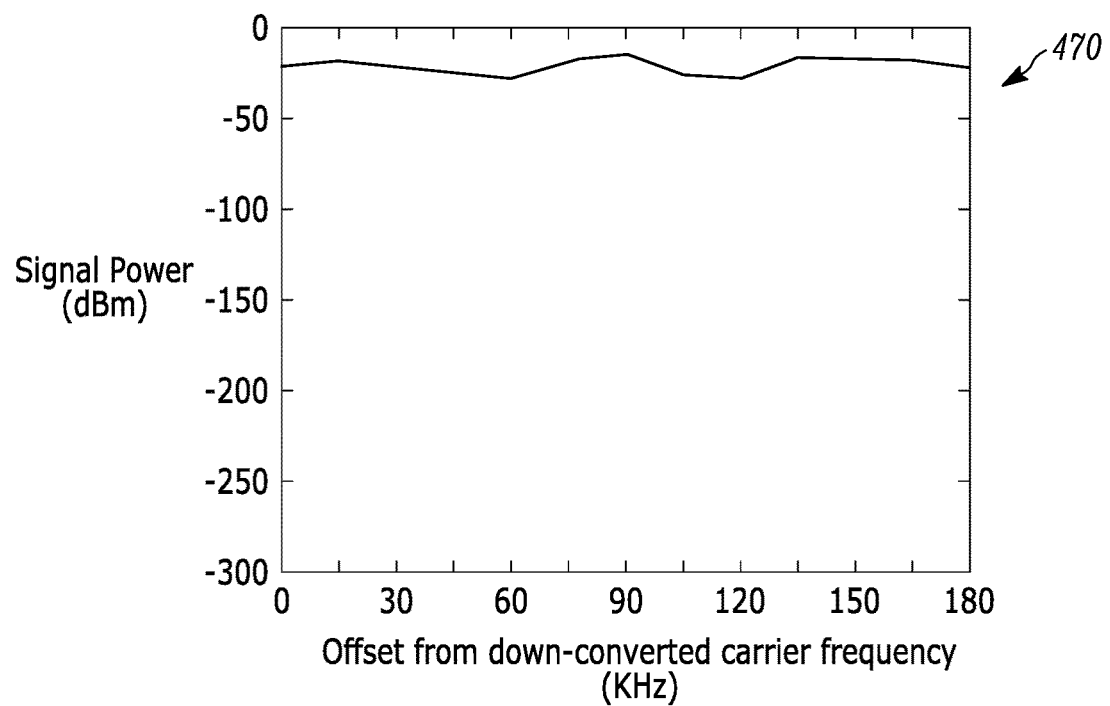
FIG. 4D illustrates, in a mobile telephony scenario, the spectrum 180 KHz above the carrier of a particular user of an embodiment of a method of the present teaching that is occupied by a combination of the up-link signal of the first co-located user and the up-/down-link signals of other co-located users.

Next consider the case where there is more than one co-located user near a particular user; four such co-located users are shown in FIG. 3. In this case the co-located users will occupy channels that are spaced every 180 KHz. Hence, the spectrum 180 KHz above the carrier of a particular user will be occupied by a combination of the up-link signal of the first co-located user, as was described above, and the up-/down-link signals of other co-located users as represented in the data illustrated in FIG. 4D in the plot 470 of the signal power versus frequency. Thus, the correlator 412 does not have a region of the spectrum, other than dc, that contains only the co-located up-link signal(s). In this situation, the second embodiment described above would not yield a reproduction of the aggregate of interfering up-link signals, because many or all of the frequencies (except dc, or f=0) in the Fourier transform of the total signal at the receive antenna can have non-zero content that is partly due to the down-link signal at those frequencies and partly due to the multiple up-link signals. Thus, one feature of the present teaching is to provide a different way to isolate regions of the spectrum where only the up-link is present within the 180 KHz bandwidth of the co-located user(s).

Some embodiments of the present teaching are based on the signal conditioner performing a method for isolating regions of the spectrum within the bandwidth of the signal(s)

that is(are) desired to be received that have content only due to the presence of the interference signal(s) and would have zero content if the signal(s) of interest alone was(were) present. In the case of a mobile telephony system as shown in FIGS. 2 and 3, the signal conditioner performs a method for isolating regions of the spectrum within the 180 KHz bandwidth of co-located user(s) that have content due only to the presence of the up-link signal(s) and would have zero content if the down-link signal(s) alone were present. Recall from the discussion of the single, co-located user that the down-link signal only contains non-zero frequency components around subcarriers spaced every 15 KHz. The up-link signal, on the other hand, is modulated onto a subcarrier comb that has the same subcarrier frequency spacing as the down-link comb, but is shifted by 7.5 KHz relative to the down-link comb. Hence to see the spectral regions between the down-link comb frequencies we need a Fourier transform that has frequency resolution that is finer than 15 KHz. The frequency resolution of the Fourier transform is fundamentally limited by the reciprocal of the sample duration, which for the present case is one resource element, so 1/66.67 μs=15 KHz. Hence to increase the frequency resolution requires a time sample that is longer than a single resource element.

Thus, some embodiments of the present teaching involve constructing a time sample that is longer than a single symbol period. One simple way to extend a time sample would be to pad out the sample, i.e. append samples with zero value. This would indeed increase the length of the time sample and consequently increase the resolution in the frequency domain, but at the expense of adding new frequencies to the spectrum of the original symbol. Thus in some embodiments of the present teaching the length of the time sample is increased by appending additional symbols of the same period to the original symbol that have been transformed using a novel integral transform. Each additional symbol is referred to as a copy, and the resulting padded sample, with attached copies, is referred to as an appended signal to distinguish it from the original time sample of the signal. In the case of a mobile telephony system as shown in FIGS. 2 and 3, a time sample that is longer than a single 66.7-μs resource element containing 12 down-link symbols is constructed by appending to one resource element of the received signal additional resource elements that have been transformed using the same novel integral transform. The novel integral transform involves taking the integral of a single symbol and normalizing each frequency component that is expected in the signal of interest that is desired to be received by a specific multiple of its corresponding frequency. In the case of a mobile telephony system as shown in FIGS. 2 and 3, the novel integral transform involves taking the integral of a single 12-symbol resource element and normalizing each of the 12 known frequency components of the down-link signal by a specific multiple of that frequency. The specific multiples are those multiples that cause the magnitude and phase of each specific frequency component of the output of the integral transform to be equal to the magnitude and phase of each specific frequency component of the input to the integral transform. In the case of a mobile telephony system in which the down-link signals in one resource element were stated above to have the form $$\text{Downlink at baseband}_{12\,symbols} = A_{down} \sum_{n=1}^{12} e^{j(2\pi n[15\,KHz]t+\varphi_{QPSK,n})},$$

these specific multiples are equal to $j \cdot 2\pi \cdot n \cdot [15\,KHz]$. Therefore, the integral transform T of the Input signal is of the following form $$(T[\text{Input}])(t\cdot\text{frequency}) = \int_{t_1}^{t_2} K(t, \text{frequency}) f\text{Input}((t, \text{frequency})dt$$

where $t_1$=the time at which one resource element begins, $t_2 = t_1 + 66.7$ μsec, and $K = j \cdot 2\pi \cdot n \cdot [15\,KHz]$, which is time-invariant and has twelve different frequency values for each value of $n = 1, 2, 3, \ldots 12$. The output of the novel integral transform T[Input] is therefore $$\text{Output} = j2\pi n[15\,KHz] \int_0^{66.7\,\mu sec} \text{Downlink at baseband}_{12\,Symbols} dt + j2\pi n[15\,KHz] \int_0^{66.7\,\mu sec} \text{Uplink at baseband}_{12\,Symbols} dt$$

which is equal to the following time-domain signal:

$$\text{Output} = \text{Downlink at baseband}_{12\,Symbols} + j2\pi n[15\,KHz] \int_0^{66.7\,\mu sec} \text{Uplink at baseband}_{12\,Symbols} dt$$

Appending one or more copies of the time sample that is produced at the output of the novel integral transform T to the original time sample produces the desired result: a time sample that is longer in duration than a single resource element yet does not introduce any new frequency content to the signal of interest that is desired to be received since it simply extends the existing data of the symbol(s) in the single time sample of the signal that is desired to be received. The number of copies of the time sample that need to be appended to the original time sample depends on the desired level of fidelity. Specifically, the fewer the number of misinterpreted symbols in the desired signal that can be tolerated, the greater the number of copies of the time sample must be appended to the original time sample. Taking the Fourier transform of the time extended symbol(s) yields a frequency spectrum with increased resolution that reveals spectral content not present in the signal of interest that is desired to be received. In this revealed spectral content there is no component of the signal of interest that is desired to be received, and therefore the correlation can proceed by minimizing the power at these spectral components at the output of the reproduction generator. In the case of a mobile telephony system as shown in FIGS. 2 and 3, taking the Fourier transform of the time extended resource element yields a frequency spectrum with increased resolution that reveal spectral content around the subcarriers of the up-link frequency comb, which are between the subcarriers of the down-link frequency comb. Since there is no down-link modulation on the up-link carriers, the correlation minimizes the power at the up-link frequency comb output of the reproduction generator. The process of appending one or more copies of the input signal over the time sample to the original input signal over the time sample would be applied to suppress the up-link signal from an aggregate of co-located user(s).

One feature of the present teaching is that the step of appending additional copies of time samples of the input signal, to an original time sample of the input signal to produce an appended signal and improve the performance of separating the desired signal from an undesired signal is general, and may be applied to a variety of transforms, including the integral transform T and Fourier transforms that are described above, as well as a Hilbert transform. Various kinds of transforms used to analyze communications signals are well known in the art. When a transform is performed on an input signal over a chosen time sample, say a sample of time duration from time $t_1$ to time $t_2$, with one or more copies of that same input signal over the chosen time sample from $t_1$ to $t_2$ appended, the performance of the transform is improved. The transform may be an integral transform T, a Fourier transform, or a Hilbert transform or other transform used to analyze communications signals. The transform may generate an imaginary-valued or complex-valued transformed signal, or a real time-varying transformed signal. In embodiments in which the transform is a Fourier transform, the performance improvement will be in the frequency resolution of desired signal with removed undesired signal. If the transform is the integral transform T, the BER of the desired signal with the undesired signal removed will be improved. The number of added copies may be any number, more appended copies produce increased performance (e.g. higher resolution or lower bit error rate) of removed signal. That is, by appending more copies, the transform produces a higher integrity version of the desired signal. In other words, appending more copies produces better removal of the undesired signal from the desired signal.

It should be understood that the methods and apparatus of the present teaching can be used to suppress any number of different undesired interference signals using a straightforward extension of the single-undesired interferer case. For example, in the mobile telephony scenario where there are two undesired up-link signals present, the antenna has no way to distinguish between these two signals. The output of the antenna will be the vector sum of these two signals. Thus, in embodiments with multiple undesired signals with known parameters, the method of finding the best magnitude and phase for the reproduction signal using the correlation described herein proceeds in the same way as with one signal present except that the correlator processes the best match to a magnitude and phase that represents the vector sum of the multiple undesired signals. This method works for any number of synchronized undesired signals of the same modulation format.

Thus, one feature of an RF signal separation and suppression system and method of the present teaching is that it can separate any number of desired signals, from any number of multiple transmitter sources, from multiple undesired signals. If all the multiple undesired signals are synchronized and of the same modulation format, then as described above, a single reproduction generator can be used to suppress the multiple undesired signals, where the reproduction signal is updated each time the symbols on the multiple undesired signals change. If the multiple undesired signals are not synchronized or have multiple modulation formats, then multiple reproduction generators may be required, up to one for each of the multiple modulation formats. Consequently, one advantage of the present teaching is that the signal separator works equally well with any number of undesired signal formats.

FIGS. 5A-5E show various data for an example of a mobile telephony scenario where there are four mobile users co-located near a particular mobile user. The up-link and down-link signals are being sent in a STAR format, i.e. they are on the same carrier, $f_c$.

Figure 5A:
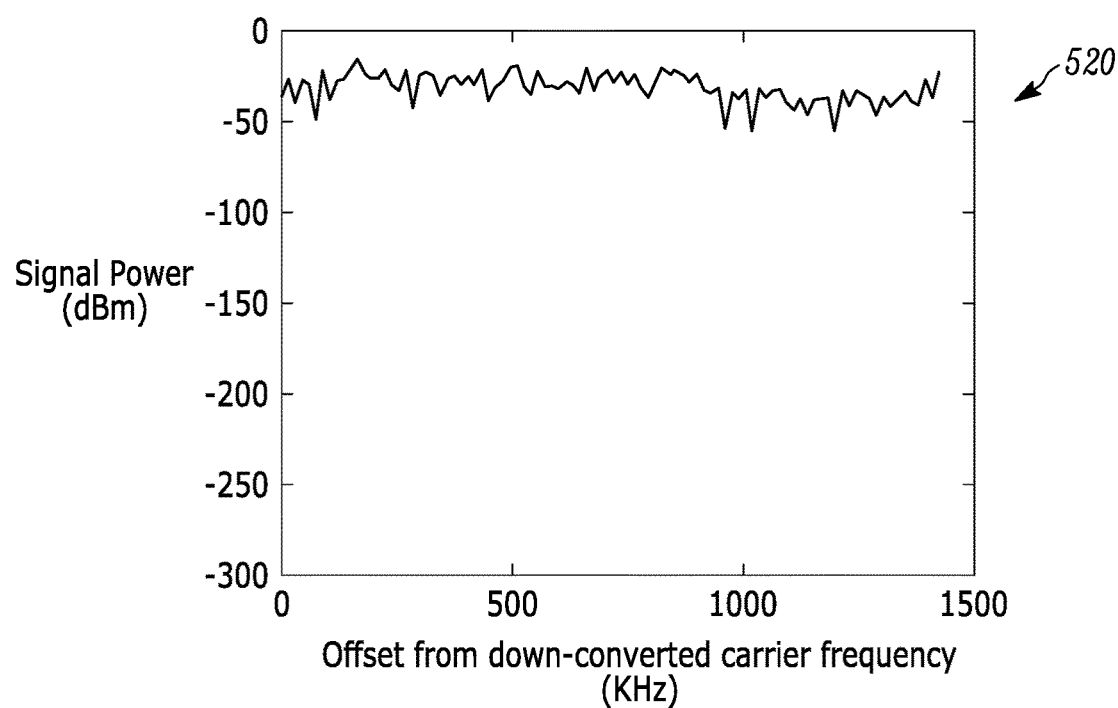
FIG. 5A illustrates spectral data in a mobile telephony scenario for the sum of four up-link signals as sensed by a particular mobile user antenna, with no down-link signal present.
Figure 5B:
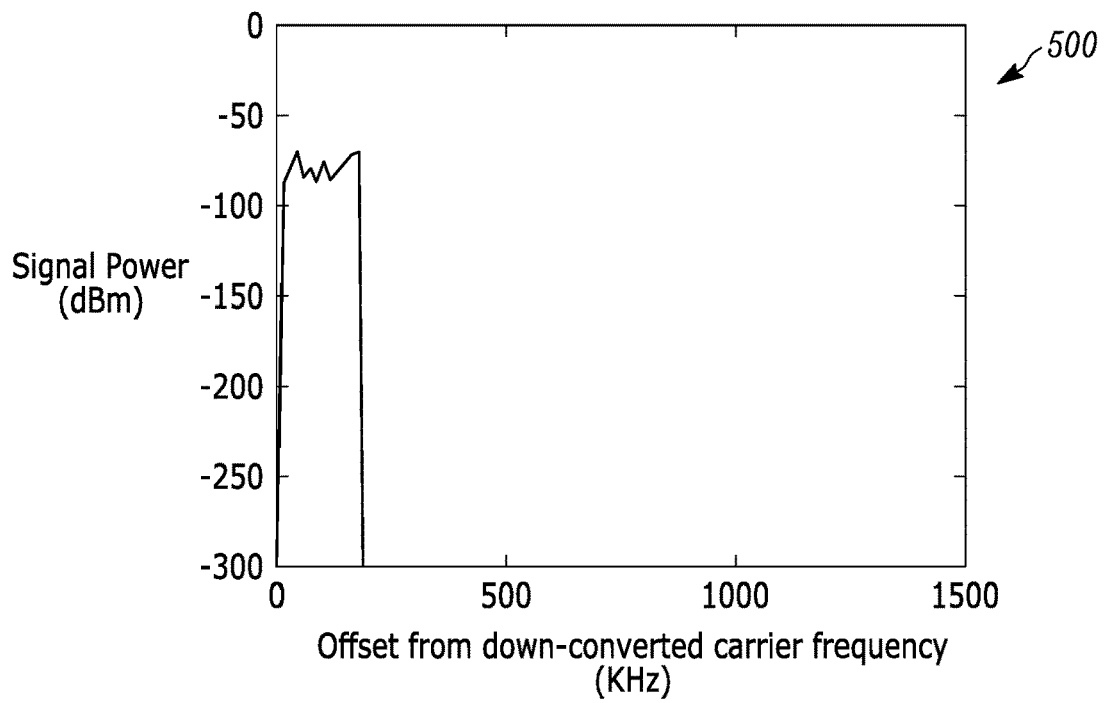
FIG. 5B illustrates spectral data in a mobile telephony scenario of the down-link signal as sensed by a particular mobile user antenna, with no up-link signals present.

The plot 500 illustrated in FIG. 5A shows spectral data in a mobile telephony scenario for the sum of four up-link signals as sensed by a particular mobile user antenna, with no down-link signal present. FIG. 5B illustrates a plot 520 of spectral data of the down-link signal as sensed by a particular mobile user antenna, with no up-link signals present.

Figure 5C:
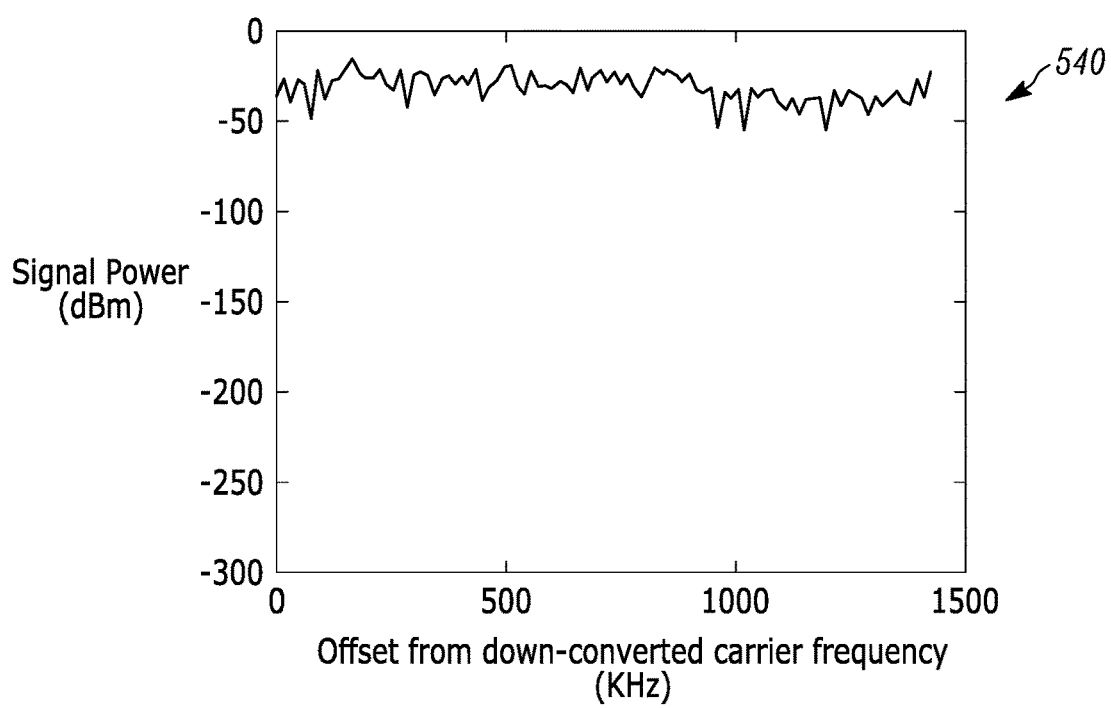
FIG. 5C illustrates a spectrum in a mobile telephony scenario as sensed by a particular mobile user antenna when both up- and down-link signals are present as shown in FIGS. 5A-B as input to the RF signal separation and suppression system according to the present teaching.

FIG. 5C illustrates a plot 540 of a spectrum in a mobile telephony scenario as sensed by a particular mobile user antenna when both up- and down-link signals are present as described in connection with FIGS. 5A-B as input to the RF signal separation and suppression system according to the present teaching. FIGS. 5A and 5C appear identical, i.e. the stronger up-link signals completely dominate over the weaker down-link signals. The signal shown in FIG. 5C is the signal that is input to the RF signal separation and suppression system of the present teaching.

Figure 5D:
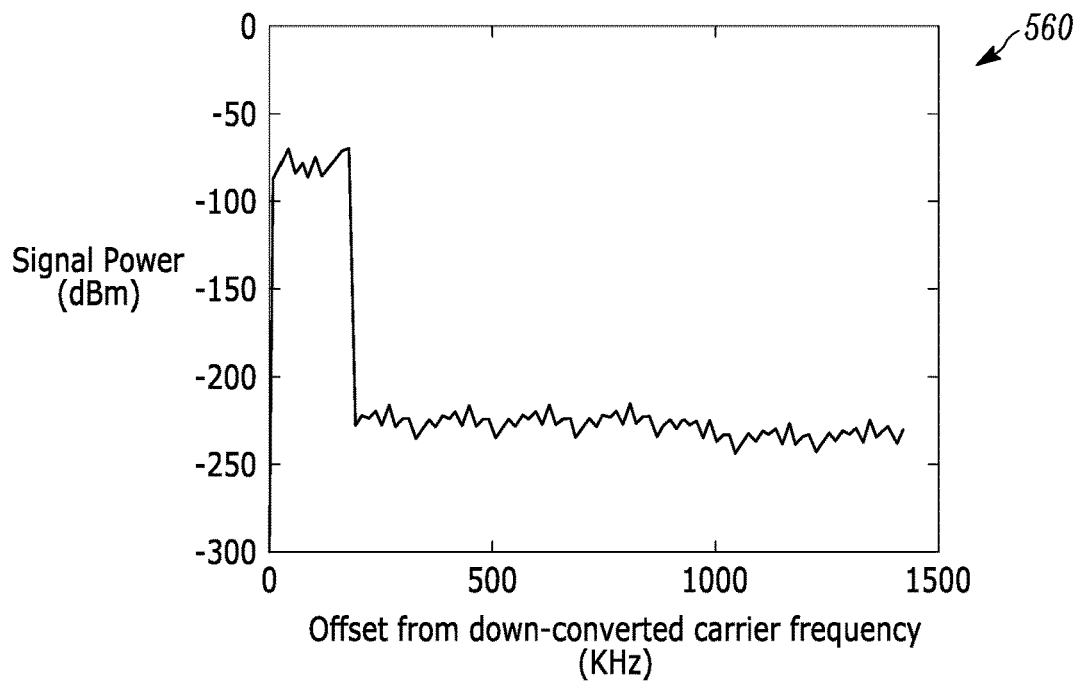
FIG. 5D illustrates, for the mobile telephony scenario described in connection with FIGS. 5A-5C, a plot of the output of the RF signal separation and suppression system of the present teaching showing the recovered desired signal and the suppressed undesired signal according to the present teaching.

FIG. 5D is a spectrum plot 560 of the output of the signal separator in the frequency domain. By comparing FIG. 5D with FIG. 5B we can see, quantitatively, that the signal separator has successfully suppressed the larger up-link signal, thereby revealing the smaller down-link signal. One aspect of the present teaching is that it is possible, using the apparatus and method described herein and assuming no noise is present, to suppress the undesired signals by eight orders of magnitude, or more.

There are two key measures in assessing the effectiveness of a separation or suppression technique: the amount by which the undesired signal is separated/suppressed and the degree to which the desired signal is left unaffected (unsuppressed). Since the suppression of the undesired signal is typically a large number, it can be plotted directly, as was shown in FIG. 5D.

Assessing the degree to which the desired signal is left unaffected can be more challenging, since the suppression of the desired signal is typically a small number, which in and of itself may not be indicative of the degree to which the desired signal has been affected/degraded. Hence one possible measure that can reveal the degradation of the desired signal is the bit error rate, BER, after the undesired signal has been separated/suppressed. As is well known in the art, there is a fundamental limit to the BER as a function of the desired signal to noise ratio, SNR. The limit also depends on the type of desired signal modulation. A common form of modulation for LTE signals is quadrature phase shift key, QPSK, modulation, for which the BER as a function of SNR is known to be:

$$BER = \tfrac{1}{2} erfc(E_b/N_0)^{1/2}$$

where erfc(x) is the complementary error function, $E_b$ is the energy per bit and $N_0$ is the noise power per Hertz.

Figure 5E:
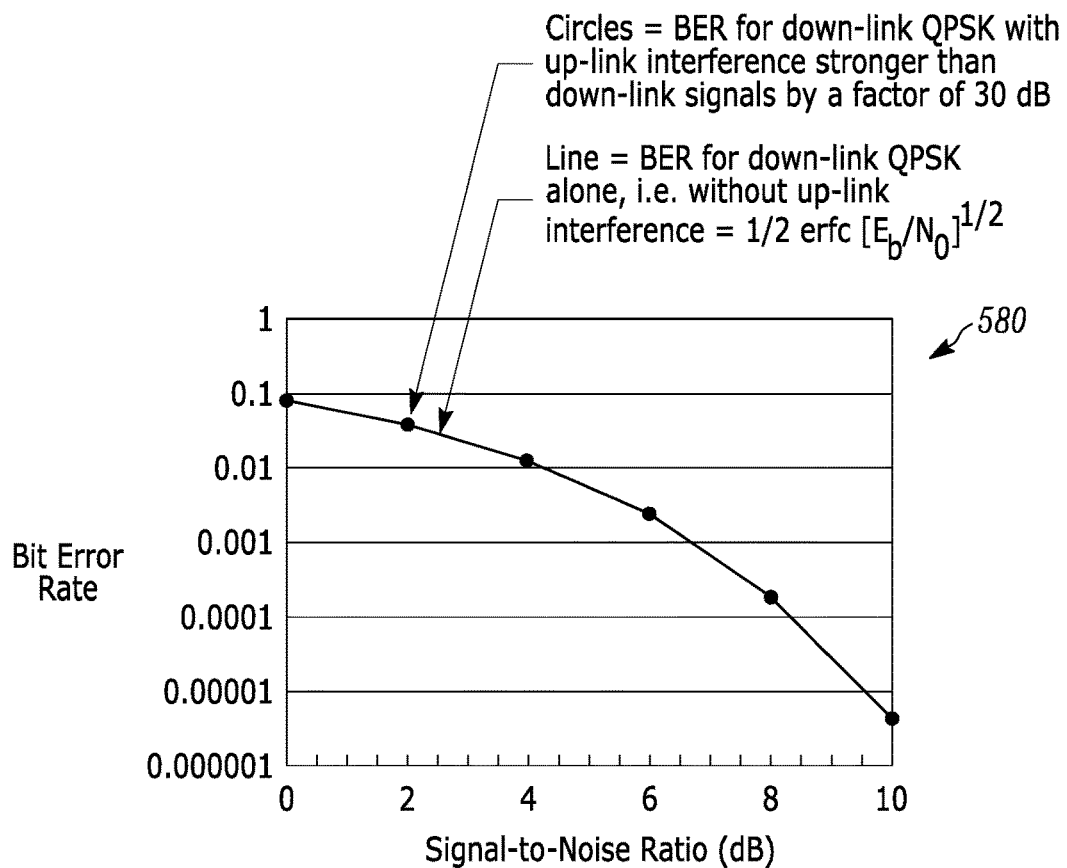
FIG. 5E illustrates, for the mobile telephony scenario described in connection with FIGS. 5A-5D, a plot of bit error rate of a received desired signal obtained when the RF signal separation and suppression system according to the present teaching has been used to separate out an undesired signal.

To use the BER to determine quantitatively how well the signal separator has isolated the desired signal without impacting the quality of the desired signal, a pseudo-random bit stream was applied to the down-link signal. The bit stream out of a receiver whose input was connected to the output of the signal separator was then compared with the bit stream that was used to modulate the down-link transmitter to determine the bit-error-rate (BER). FIG. 5E is a plot 580 of the BER vs. down-link SNR evaluated at specific values of $E_b/N_0$. It can be concluded from this plot that the signal separation/suppression technique of the present teaching has minimal impact on the desired signal, since the BER of the down-link signal at the output of a receiver whose input was connected to the output of the signal suppressor closely follows the theoretical BER curve for down-link QPSK alone, without up-link interference, that is, in the absence of undesired signals. When the signal separation and suppression of the undesired up-link signal was performed without the integral processing of the present teaching—that is, when bypassing the integral transform block 413 in FIG. 4A, the output of the reproduction generator 400 included an occasional symbol of the desired down-link signal, which would then be subtracted from the input signal 102 by the subtractor 124 in FIG. 1. This would result in BER data points that lie above the line plotted in FIG. 5E for the case where no undesired up-link interference was present, particularly for large values of signal-to-noise ratio. The integral processing of the present method therefore improves the performance of the mobile telephony system in which desired down-link signals are separated from undesired interfering up-link signals transmitted by co-located mobile users. The BER data points that lie directly on the line plotted in FIG. 5E for the case where no undesired up-link interference was present were obtained in the presence of the up-link signals of the user and four co-located users when the integral transform T processing of the present method was performed and 99 copies of the transformed time sample were appended to the first time sample. Only when this many copies were appended was the additional frequency content in the Fourier transform sufficient to enable the down-link signal to be distinguished from the aggregate of the up-link signals well enough to yield a BER as good as the BER for the case where no up-link signals were present.

In another embodiment of the method of the present teaching, the RF signal and suppression system with the integral processing of the present teaching is used in a scenario where a strong continuous-wave (CW) interference signal lies within the bandwidth of a lower-power signal of interest that is desired to be received. FIGS. 6A-6E illustrate various data for an example of a desired signal of interest that consists of QPSK data modulating an RF carrier frequency at a rate of 1.2 MSamples/second and a much stronger (10-W, or +40-dBm) continuous wave undesired interference signal at a frequency just 100 KHz above the carrier frequency of the desired signal of interest. Thus, these embodiments can have the undesired signal bandwidth within the bandwidth of the desired signal. As such, one is not able to use filtering to remove the undesired signal from the desired signal.

Figure 6A:
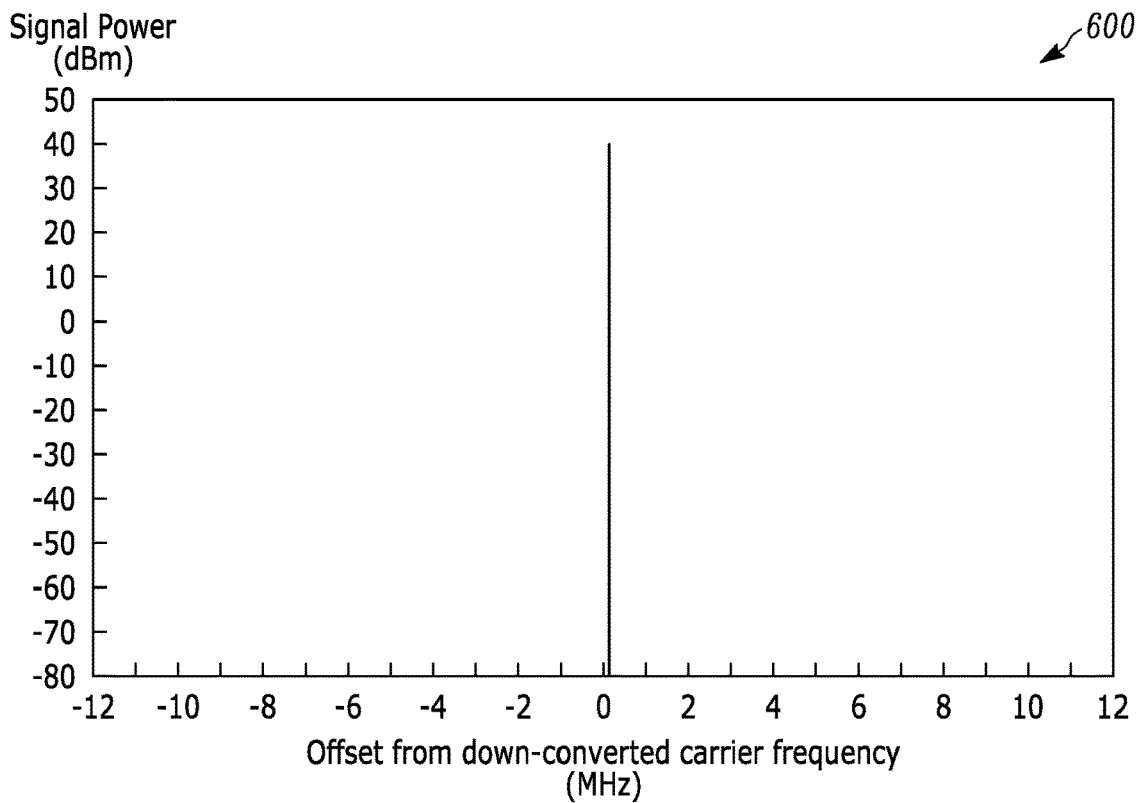
FIG. 6A illustrates a plot of spectral data for an interference signal comprising a strong continuous-wave (CW) tone that is sensed by an RF antenna and down-converted, when no weaker signal of interest is present.

The data presented in connection with FIGS. 6A-E can be obtained with the methods described in connection with FIG. 7. FIG. 6A illustrates a plot 600 of spectral data for an undesired signal that is sensed by an RF antenna and down-converted, when no weaker desired signal is present. This undesired signal is a strong (+40-dBm) continuous-wave (CW) tone that is 100 KHz greater than the RF carrier frequency of an anticipated desired signal.

Figure 6B:
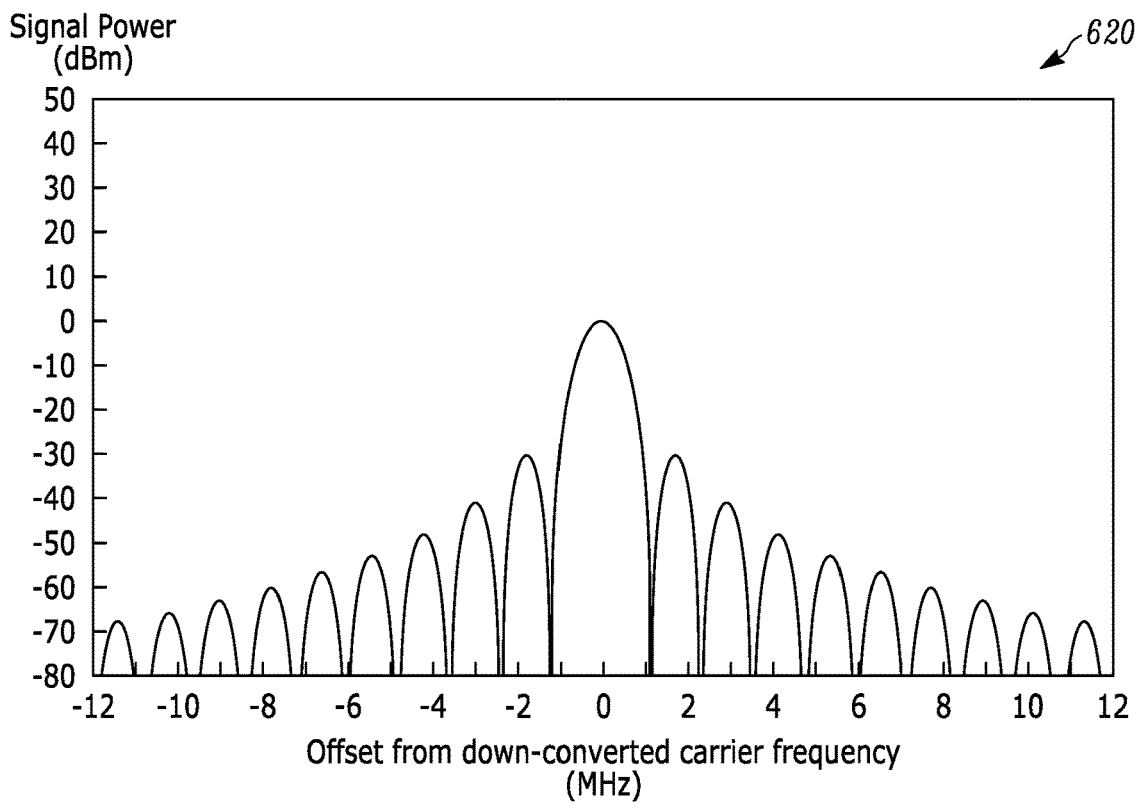
FIG. 6B illustrates a plot of spectral data for a signal of interest comprising a QPSK signal with a data rate of 1.2 MSymbols/second that is sensed by an RF antenna and down-converted, when no interference signal is present.

FIG. 6B illustrates a plot 620 of spectral data for a desired signal that is sensed by an RF antenna and down-converted, when no undesired signal is present. This desired signal is a QPSK signal with a data rate of 1.2 MSymbols/second that the antenna sensed on an RF carrier that is weak relative to the undesired signal of FIG. 6A.

Figure 6C:
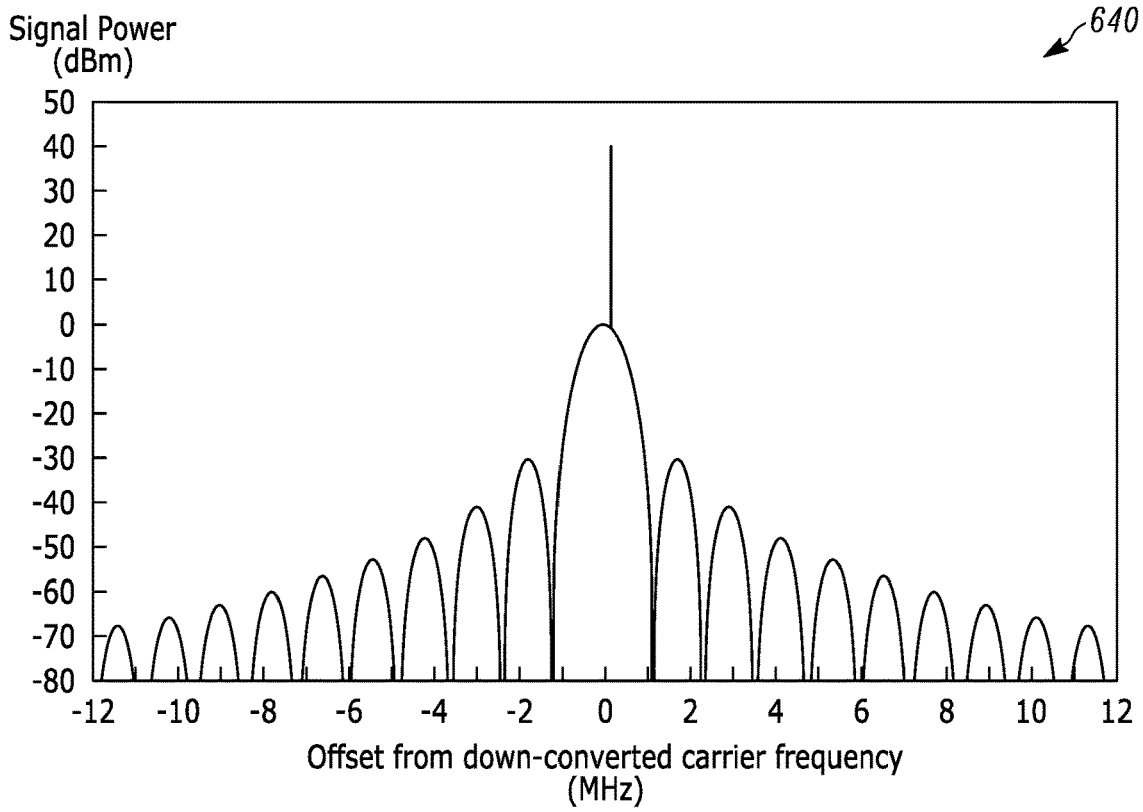
FIG. 6C illustrates a plot of spectral data for two signals comprising (1) a QPSK signal of interest; and (2) a much stronger continuous-wave interferer that are simultaneously sensed by an RF antenna and down-converted.

FIG. 6C illustrates a plot 640 of spectral data for two signals that are simultaneously sensed by an RF antenna and down-converted. The two signals are those shown in FIGS. 6A and 6B, specifically (1) a QPSK desired signal with a data rate of 1.2 MSymbols/second that modulates an RF carrier frequency and (2) a much stronger continuous-wave undesired signal that is 100 KHz greater than the carrier frequency of the desired signal of interest.

Figure 6D:
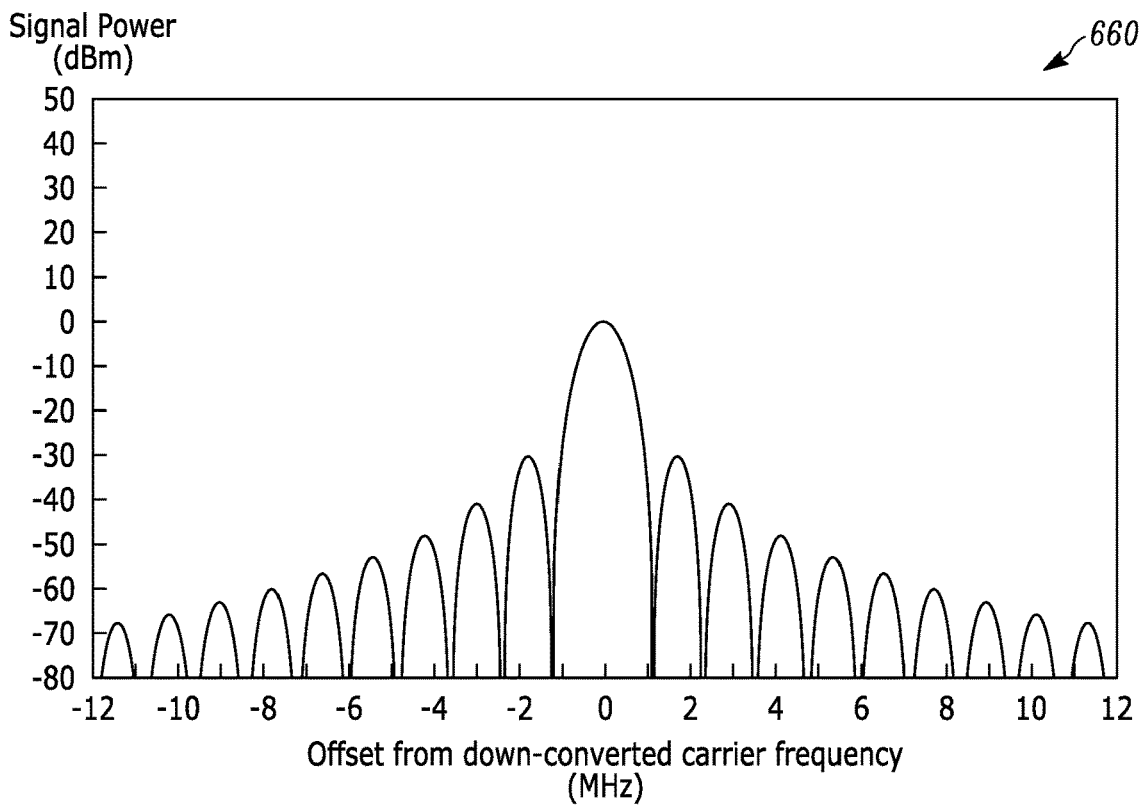
FIG. 6D illustrates a plot of the output of the RF signal separation and suppression system of the present teaching showing the recovered desired QPSK signal of interest of FIG. 6B and the suppressed undesired interference signal of FIG. 6A according to the present teaching.

FIG. 6D illustrates a plot 660 of the output of the RF signal separation and suppression system of the present teaching, showing the recovered desired QPSK signal of interest of FIG. 6B and the suppressed undesired interference signal of FIG. 6A according to the present teaching.

Figure 6E:
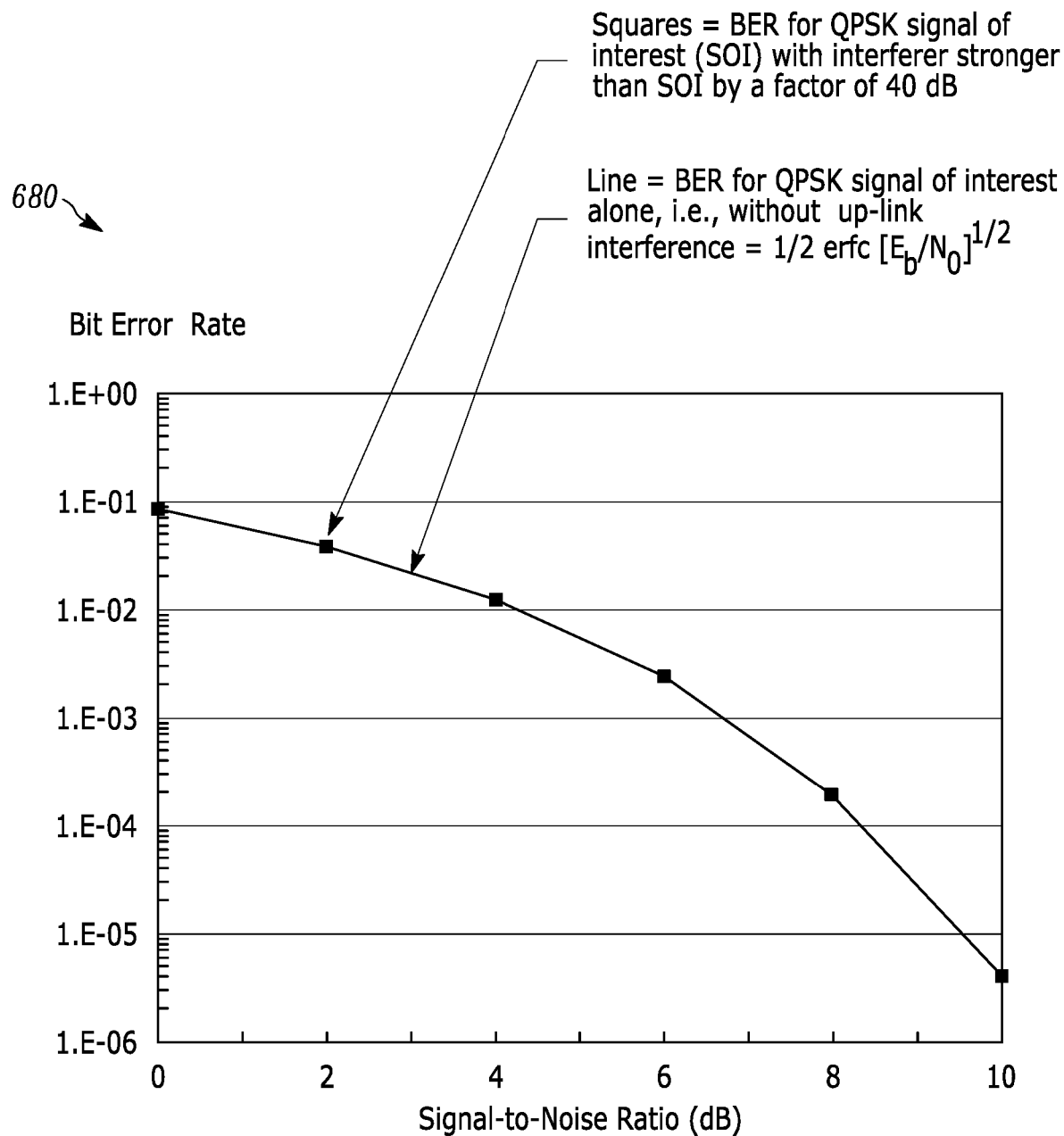
FIG. 6E illustrates a plot of bit error rate of a received desired QPSK signal of interest as shown in FIG. 6B, obtained when the RF signal separation and suppression system according to the present teaching has been used to separate out an undesired interference signal as shown in FIG. 6A.

FIG. 6E illustrates a plot 680 of the bit error rate of a received desired QPSK signal of interest as shown in FIG. 6B, obtained when the RF signal separation and suppression system according to the present teaching has been used to separate out an undesired interference signal as shown in FIG. 6A. To achieve the BER performance shown in FIG. 6E, the integral transform T processing of the present method was performed and 99 copies of the transformed time sample were appended to the first time sample.

One feature of the present teaching is that a desired signal may be demodulated directly from a reproduction. Recall from the definition of a reproduction described herein that when the signal to be reproduced is in fact the sum of several individual signals, i.e more than one, a reproduction does not contain the format and multiplexing information about each individual signal and hence for the multiple signal case a reproduction signal cannot be demodulated to recover any information that may be on each of the individual signals. However, in the case where the signal to be reproduced contains only one signal it turns out that the reproduction does indeed contain sufficient information to recover any information that may be on the single signal. This unexpected finding enables another way of applying the present teaching.

In some embodiments of the present teaching, there is only one desired signal and one or more undesired signals. In these embodiments one can use the reproduction generator of the present teaching to reproduce a copy of the single, desired signal rather than generating a reproduction of the aggregate of the undesired signals as is done in other embodiments. In embodiments that reproduce a copy of the desired signal, once one has a reproduction of the desired signal, one does not proceed to subtracting it from the total input signal, but rather uses the physical layer information about the formatting and multiplexing information of the single, desired signal.to demodulate the reproduction and recover the information contained on the desired signal.

Figure 7:
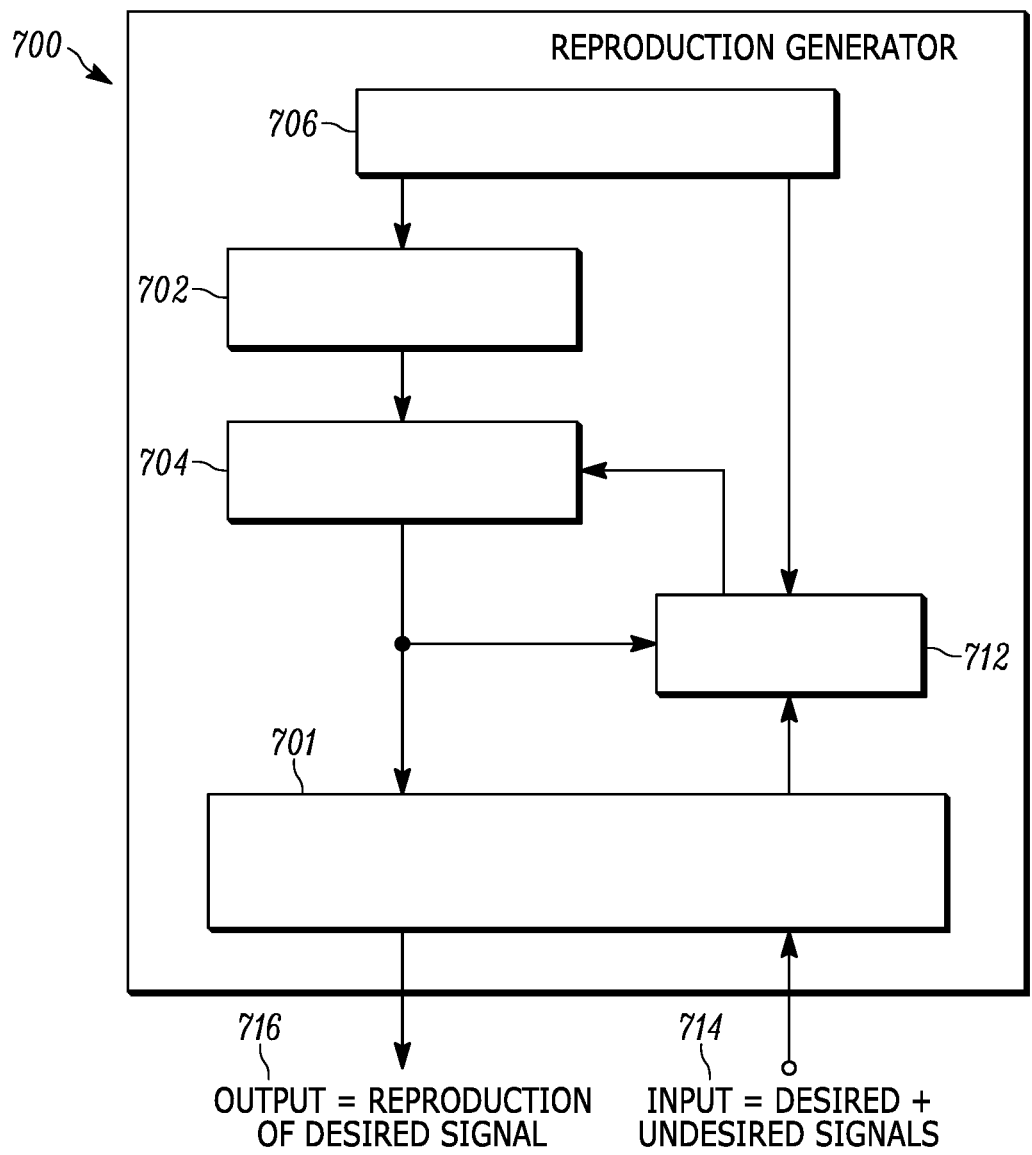
FIG. 7 illustrates a block diagram of an embodiment of a reproduction generator that uses integral processing to generate a reproduction of a desired signal of the present teaching.

FIG. 7 illustrates a block diagram of an embodiment of a reproduction generator 700 that uses integral processing to generate a reproduction of a desired signal of the present teaching. A signal conditioner 701 performs a transform on an input signal 714 comprising desired and undesired signals. An output of the signal conditioner 701 is electrically connected to a signal correlator 712. The signal correlator 712 receives signal parameter signals of the desired signal from a signal parameter generator 706. Desired signal parameters generated by the parameter generator 706 are produced in a generator 702 and are adjusted in adjuster 704, using inputs from an output of correlator 712. For example, in embodiments where the desired signal is a downlink signal in an RF LTE system, the generator 702 produces a downlink frequency comb and the adjuster 704 produces magnitude and phase adjustment of the comb. The signal conditioner 701 receives the output of the adjuster 704.

In some methods, the signal conditioner 701 performs an inverse transform on the signal generated by the adjuster 704, and the inverse transformed signal is provided to a second output 716 of the signal conditioner 701, which is the output of the reproduction generator 700. The output of the reproduction generator 700 is a reproduction of the desired signal, which is directly demodulated. The resulting demodulated signal generated by the reproduction generator 700 has a lower BER than a demodulation of the desired signal presented to the input 714 of the reproduction generator 700 as the combination of desired and undesired signals.

The examples described herein of the performance that is achievable using the methods and apparatus of the present teaching show that the methods and apparatus of the present teaching are capable of achieving, simultaneously, both high separation/suppression of the undesired signal and negligible degradation of the desired signal. Applying the methods and apparatus of the present teaching to a particular application can result in more or less suppression of the undesired signal and/or lesser or greater degradation of the desired signal. One skilled in the art will appreciate that the numerous alternate implementations of the present teachings also fall within the scope of the present teachings.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A method of separating a desired signal from an undesired signal, the method comprising:
   a) coupling to an input of an RF signal separation and suppression system a total Input signal comprising the desired signal and the undesired signal in a time domain occupying a time duration from time $t_1$ to time $t_2$ of a single symbol in the desired signal;
   b) performing with a reproduction generator an integral transform T[Input] of the total Input signal using the following expression:

$$(T[\text{Input}])(t, \text{frequency}) = \int_{t_1}^{t_2} K(t, \text{frequency}) * \text{Input}(t, \text{frequency}) dt$$

wherein K[t, frequency] comprises a copy of known frequency components in the desired signal, and wherein an output of the integral transform T[Input] of the total Input signal is a time domain signal representing the desired signal that is generated at an electrical output of the RF signal separation and suppression system.

2. The method of separating the desired signal from the undesired signal of claim 1 wherein the time duration from time $t_1$ to time $t_2$ comprises a time duration of simultaneously transmitted sets of symbols in the desired signal.

3. The method of separating the desired signal from the undesired signal of claim 1 wherein K comprises a time-invariant scaled copy of all known frequency components in the desired signal.

4. The method of separating the desired signal from the undesired signal of claim 1 wherein $K_n = j \cdot 2\pi \cdot f_n$, and wherein the desired signal comprises n frequency components, each frequency component at a different frequency $f_n$.

5. The method of separating the desired signal from the undesired signal of claim 4 wherein the desired signal has frequency components at a plurality of frequencies equal to n×a predetermined frequency, wherein n=1, 2, 3, . . . N, and $K_n = j \cdot 2\pi \cdot n \cdot [\text{the predetermined frequency}]$.

6. The method of separating the desired signal from the undesired signal of claim 1 wherein the total Input signal comprises an electrical signal.

7. The method of separating the desired signal from the undesired signal of claim 1 further comprising appending the time domain signal representing one or more copies of the total Input signal in the time duration from time $t_1$ to time $t_2$ of the desired signal to the total Input signal, thereby generating an appended signal representing a longer time sample of the total Input signal such that the Fourier transform of the appended signal has frequency components that lie between frequency components of the integral transform T[Input] of the total Input signal.

8. The method of separating the desired signal from the undesired signal of claim 1 further comprising appending the time domain signal representing one or more copies of a set of symbols of the total Input signal in the time duration from time $t_1$ to time $t_2$ of the desired signal to the total Input signal, thereby generating an appended signal representing a longer time sample of the total Input signal such that the Fourier transform of the appended signal has frequency components that lie between frequency components of the integral transform T[Input] of the total Input signal.

9. The method of separating the desired signal from the undesired signal of claim 1 further comprising appending one or more copies of the total Input signal in the time duration from time $t_1$ to time $t_2$ of the time domain signal representing the desired signal to the total Input signal, thereby improving the bit-error-rate (BER) of the desired signal.

10. The method of separating the desired signal from the undesired signal of claim 1 further comprising appending one or more copies of a set of symbols of the total Input signal in the time duration from time $t_1$ to time $t_2$ of the desired signal to the total Input signal, thereby improving the bit-error-rate (BER) of the desired signal.

11. The method of separating the desired signal from the undesired signal of claim 1 further comprising appending one or more copies of the total Input signal in the time duration from time $t_1$ to time $t_2$ of the time domain signal representing the desired signal to the total Input signal, thereby improving frequency resolution of the desired signal.

12. A method of separating a desired signal from an undesired signal, the method comprising:
   a) coupling to an input of an RF signal separation and suppression system a total Input signal comprising the desired signal and the undesired signal in a time domain occupying a time duration from time $t_1$ to time $t_2$ of a single symbol in the desired signal;
   b) appending with a reproduction generator one or more copies of the total Input signal occupying a time duration from time $t_1$ to time $t_2$ to the total Input signal, thereby generating an appended Input signal; and performing a transform with the reproduction generator of the appended Input signal, thereby generating a representation of the desired signal at an electrical output of the RF signal separation and suppression system.

13. The method of separating the desired signal from the undesired signal of claim 12 wherein the performing the transform of the appended Input signal comprises generating a complex-valued transformed signal from the appended Input signal that is function of frequency.

14. The method of separating the desired signal from the undesired signal of claim 12 wherein the transform comprises a Fourier transform.

15. The method of separating the desired signal from the undesired signal of claim 12 wherein the performing the transform of the appended Input signal comprises generating a real time-varying variable transformed signal from the appended Input signal.

16. The method of separating the desired signal from the undesired signal of claim 12 wherein the transform comprises a Hilbert transform.

17. The method of separating the desired signal from the undesired signal of claim 12 wherein the performing the transform of the appended Input signal comprises generating a time-domain transformed signal.

18. The method of separating the desired signal from the undesired signal of claim 12 wherein the transform comprises an integral transform.

19. The method of separating the desired signal from the undesired signal of claim 18 wherein the integral transform comprises an integral transform T[Input] of the total Input signal generated using the following expression:

$$(T[\text{Input}])(t, \text{frequency}) = \int_{t_1}^{t_2} K(t, \text{frequency}) * \text{Input}(t, \text{frequency}) dt$$

wherein K[t, frequency] comprises a copy of known frequency components in the desired signal, and wherein an output of the integral transform T[Input] of the total Input signal is a time domain signal representing the desired signal.

20. The method of separating the desired signal from the undesired signal of claim 12 wherein the performing the transform of the appended Input signal comprises generating a complex time-varying variable transformed signal.

21. A method of separating a desired signal from an undesired signal, the method comprising:
   a) coupling a radio frequency signal comprising the desired signal and the undesired signal;
   b) generating a basis function of the undesired signal;
   c) generating a reproduction of the undesired signal from the basis function and from the coupled radio frequency signal comprising the desired signal and the undesired signal;
   d) adjusting the basis function of the undesired signal based on a correlation between the generated reproduction and a sum of the desired signal and the undesired signal; and
   e) using the generated reproduction to suppress the undesired signal thereby generating an output radio frequency signal comprising the desired signal and a suppressed undesired signal.

22. The method of separating the desired signal from the undesired signal of claim 21 wherein the generating the basis function of the undesired signal comprises generating the basis function from signal parameters of the undesired signal.

23. The method of separating the desired signal from the undesired signal of claim 21 wherein the generating the output radio frequency signal comprising the desired signal and the suppressed undesired signal improves a bit error rate (BER) of the desired signal.

24. A method of separating a desired signal from an undesired signal, the method comprising:
   a) coupling a radio frequency signal comprising the desired signal and the undesired signal;
   b) generating a basis function of the undesired signal;
   c) generating a reproduction of the desired signal from the basis function and from the coupled radio frequency signal comprising the desired signal and the undesired signal;
   d) adjusting the basis function of the undesired signal based on a correlation between the generated reproduction and a sum of the desired signal and the undesired signal; and
   e) demodulating the reproduction of the desired signal to recover the information contained in the desired signal.

25. The method of separating the desired signal from the undesired signal of claim 24 wherein the generating the reproduction of the desired signal comprises generating the reproduction from signal parameters of the desired signal.

26. The method of separating the desired signal from the undesired signal of claim 24 wherein the demodulating the reproduction of the desired signal improves a bit error rate (BER) of the desired signal.

* * * * *